(12) United States Patent
Honglei

(10) Patent No.: US 10,966,101 B2
(45) Date of Patent: Mar. 30, 2021

(54) MOBILE COMMUNICATION SYSTEM, USER EQUIPMENT, BASE STATION, BASE BAND CIRCUITRY, METHODS, MACHINE READABLE MEDIA AND COMPUTER PROGRAMS TO COMMUNICATE IN A MOBILE COMMUNICATION SYSTEM

(71) Applicant: Apple Inc., Cupertino, CA (US)

(72) Inventor: Miao Honglei, Munich (DE)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 16/243,206

(22) Filed: Jan. 9, 2019

(65) Prior Publication Data

US 2019/0215701 A1 Jul. 11, 2019

Related U.S. Application Data

(60) Provisional application No. 62/615,884, filed on Jan. 10, 2018.

(51) Int. Cl.
*H04W 16/28* (2009.01)
*H04L 1/18* (2006.01)
*H04W 24/02* (2009.01)
*H04B 7/06* (2006.01)
*H04W 48/12* (2009.01)
*H04W 84/04* (2009.01)
*H04B 7/08* (2006.01)

(52) U.S. Cl.
CPC .......... *H04W 16/28* (2013.01); *H04B 7/0617* (2013.01); *H04L 1/1812* (2013.01); *H04W 24/02* (2013.01); *H04W 48/12* (2013.01); *H04B 7/08* (2013.01); *H04W 84/042* (2013.01)

(58) Field of Classification Search
CPC ..... H04W 16/28; H04W 24/02; H04W 48/12; H04W 84/042; H04L 1/1812; H04B 7/0617; H04B 7/08
See application file for complete search history.

(56) References Cited

U.S. PATENT DOCUMENTS

| | | | |
|---|---|---|---|
| 10,455,547 B2 * | 10/2019 | Islam | H04B 7/0619 |
| 10,511,373 B2 | 12/2019 | Wilson et al. | |
| 2018/0131425 A1 * | 5/2018 | Li | H04W 72/1284 |
| 2019/0141693 A1 * | 5/2019 | Guo | H04L 5/0053 |
| 2019/0181941 A1 | 6/2019 | Kim et al. | |
| 2019/0297547 A1 | 9/2019 | Tsai et al. | |
| 2020/0068548 A1 * | 2/2020 | Guan | H04L 5/0055 |
| 2020/0288479 A1 * | 9/2020 | Xi | H04B 7/02 |

* cited by examiner

*Primary Examiner* — Ajay Cattungal
(74) *Attorney, Agent, or Firm* — Kowert, Hood, Munyon, Rankin & Goetzel, P.C.

(57) ABSTRACT

Examples provide a mobile communication system, user equipment, a base station, base band circuitry, methods, machine readable media and computer programs to communicate in a mobile communication system. The method for user equipment, which is configured to communicate in a mobile communication system, comprises receiving, using radio resources on a first antenna beam, an instruction to receive control data on radio resources on a second antenna beam; acknowledging reception of the instruction; and monitoring the radio resources on the first antenna beam for a repetition of the instruction after receiving the instruction.

23 Claims, 17 Drawing Sheets

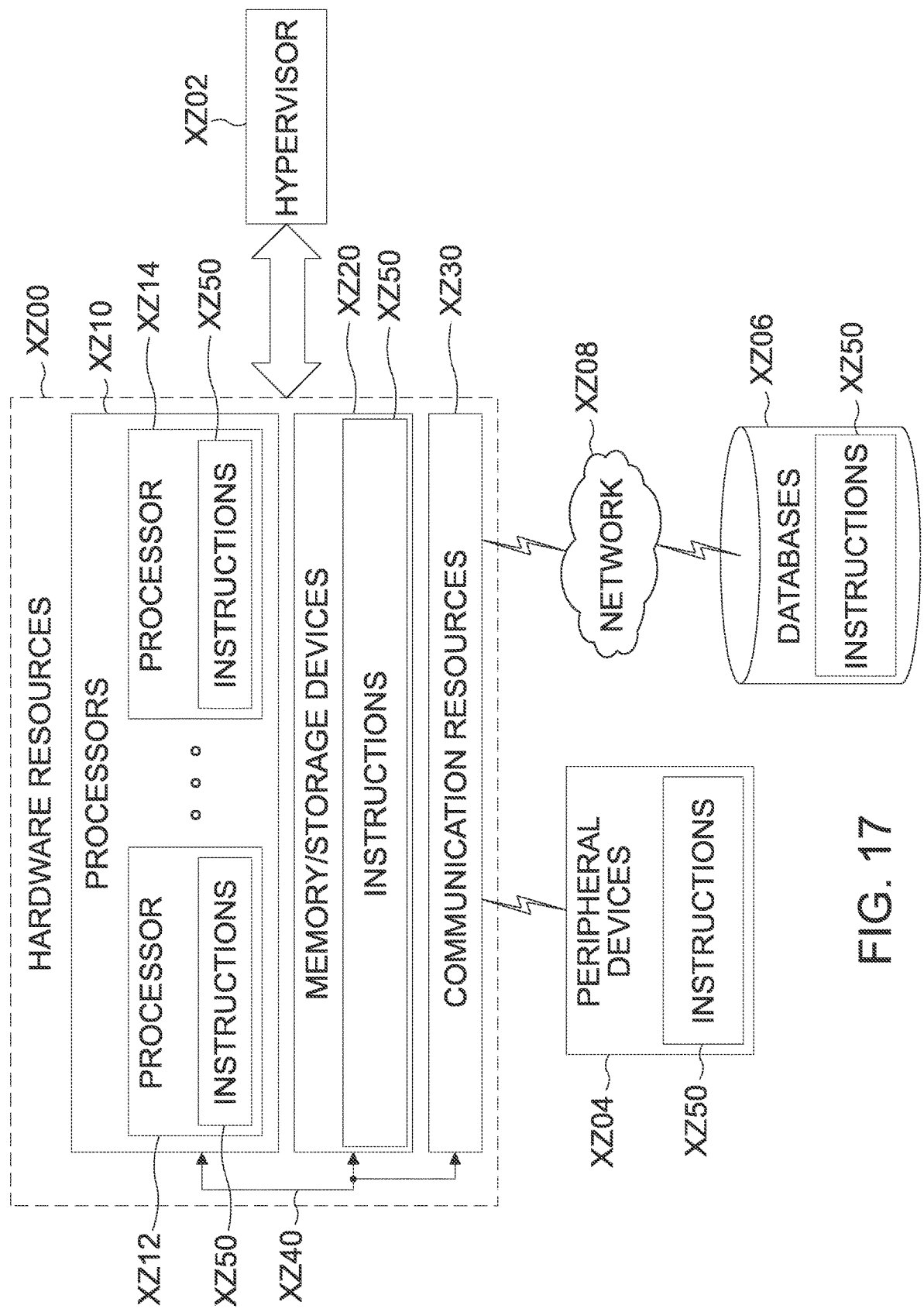

MOBILE COMMUNICATION SYSTEM, USER EQUIPMENT, BASE STATION, BASE BAND CIRCUITRY, METHODS, MACHINE READABLE MEDIA AND COMPUTER PROGRAMS TO COMMUNICATE IN A MOBILE COMMUNICATION SYSTEM

The present application is a subsequent application claiming priority of U.S. application No. 62/615,884, which is incorporated herein in its entirety.

FIELD

Examples relate to a concept for a mobile communication system, user equipment, a base station, base band circuitry, methods, machine readable media and computer programs to communicate in a mobile communication system, and particularly, but not exclusively, to a concept for addressing antenna beam misalignments between user equipment and a base station in a mobile communication system.

BACKGROUND

Radio environment becomes more and more diverse. While new wireless standards and communication systems get introduced, signal processing becomes more and more advanced. One concept that becomes more and more important is beamforming. Advanced antenna technologies are used to focus transmission and reception on certain directions. This may be particularly important when operating frequencies of mobile communication systems get higher and free space loss increases.

BRIEF DESCRIPTION OF THE FIGURES

Some examples of apparatuses and/or methods and/or computer programs will be described in the following by way of example only, and with reference to the accompanying figures, in which

FIG. 17 illustrates components capable to read machine-readable instructions in an example.

DETAILED DESCRIPTION

Figure 1:
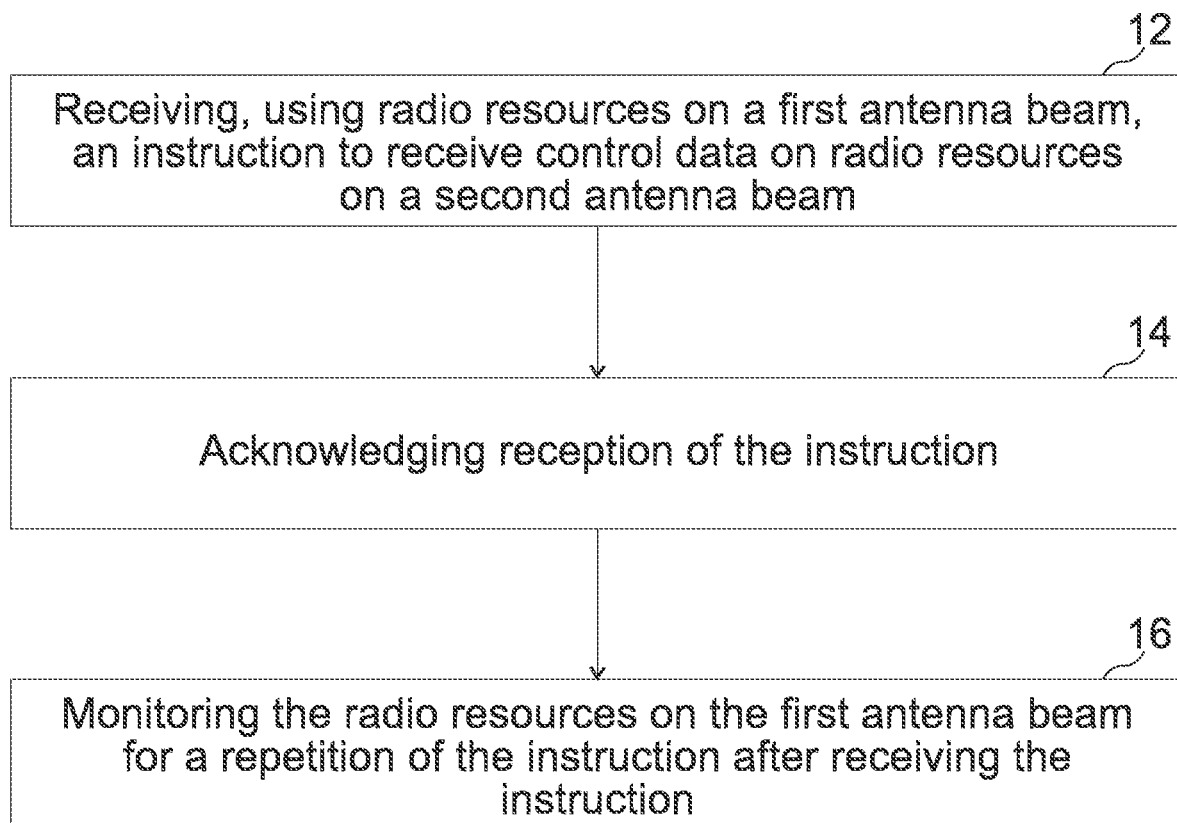
FIG. 1 shows a block diagram of an example of a method for user equipment.

Various examples will now be described more fully with reference to the accompanying drawings in which some examples are illustrated. In the figures, the thicknesses of lines, layers and/or regions may be exaggerated for clarity. Optional components are shown in broken or dotted lines.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong. The terms "example" and "embodiment" are used synonymously.

FIG. 1 shows a block diagram of an example of a method 10 for user equipment, which is configured to communicate in a mobile communication system. The method 10 for user equipment comprises receiving 12, using radio resources on a first antenna beam, an instruction to receive control data on radio resources on a second antenna beam. The method 10 comprises acknowledging 14 reception of the instruction. The method 10 further comprises monitoring 16 the radio resources on the first antenna beam for a repetition of the instruction after receiving the instruction. By monitoring 16 the first antenna beam for the repetition beam misalignment can be detected in case of a lost or erroneously received acknowledgement.

Figure 2:
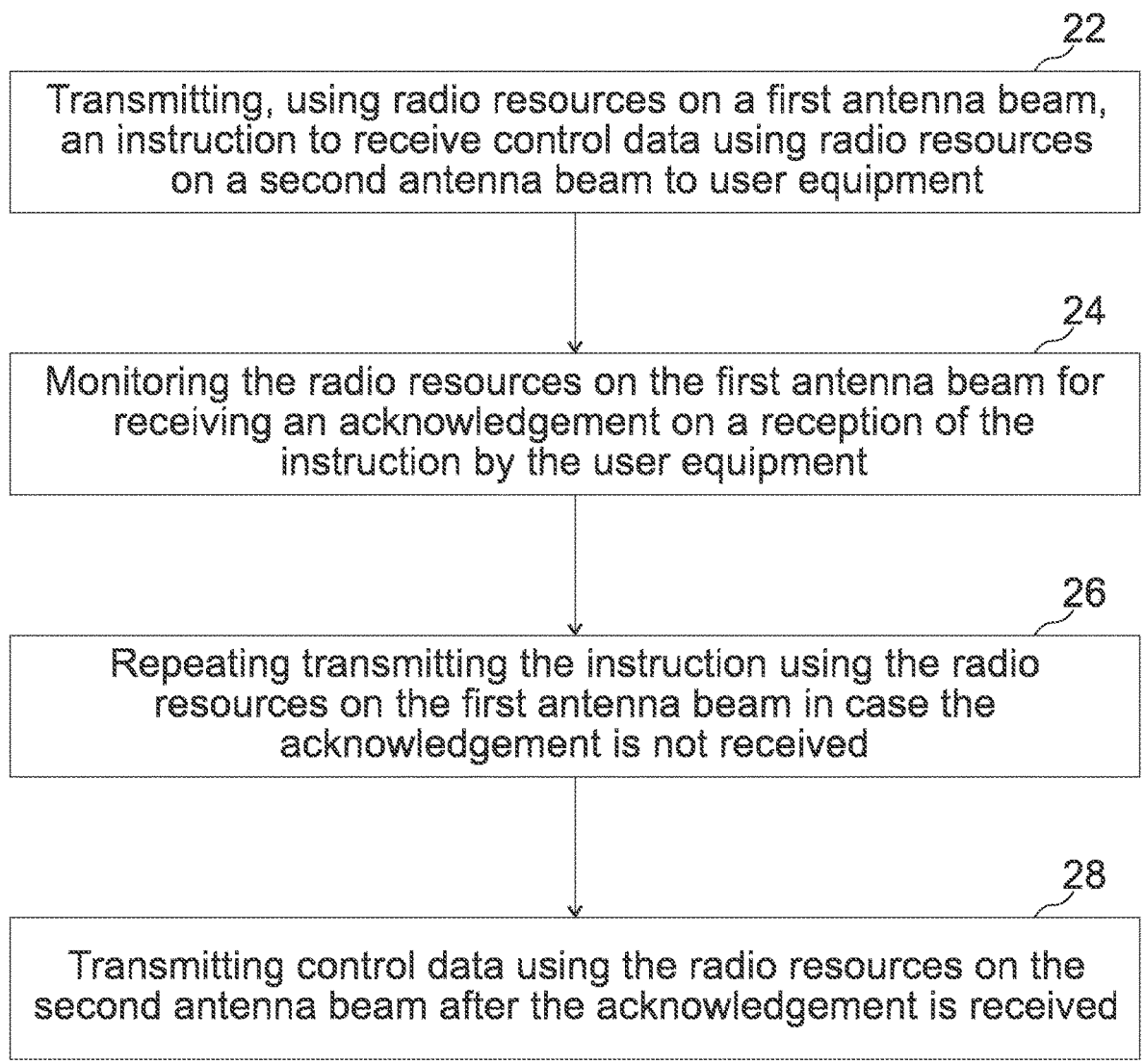
FIG. 2 shows a block diagram of an example of a method for a base station.

FIG. 2 shows an according block diagram of an example of a method 20 for a base station, which is configured to communicate in the mobile communication system. The method 20 comprises transmitting 22, using radio resources on a first antenna beam, an instruction to receive control data using radio resources on a second antenna beam to user equipment. The method further comprises monitoring 24 the radio resources on the first antenna beam for receiving an acknowledgment on a reception of the instruction by the user equipment. The method 20 further comprises repeating 26 transmitting the instruction using the radio resources on the first antenna beam in case the acknowledgement is not received. The method 20 also comprises transmitting 28 control data using the radio resources on the second antenna beam after the acknowledgment is received.

A further example is a computer program having a program code for performing any of the methods 10, 20 described herein, when the computer program is executed on a computer, a processor, or a programmable hardware component. A machine readable storage including machine readable instructions, when executed, to implement a method or realize an apparatus or circuitry as exemplified in any of the methods or circuitry herein is another example. Yet another example is a machine readable medium including code, when executed, to cause a machine to perform any of the methods 10, 20 described herein.

Figure 3:
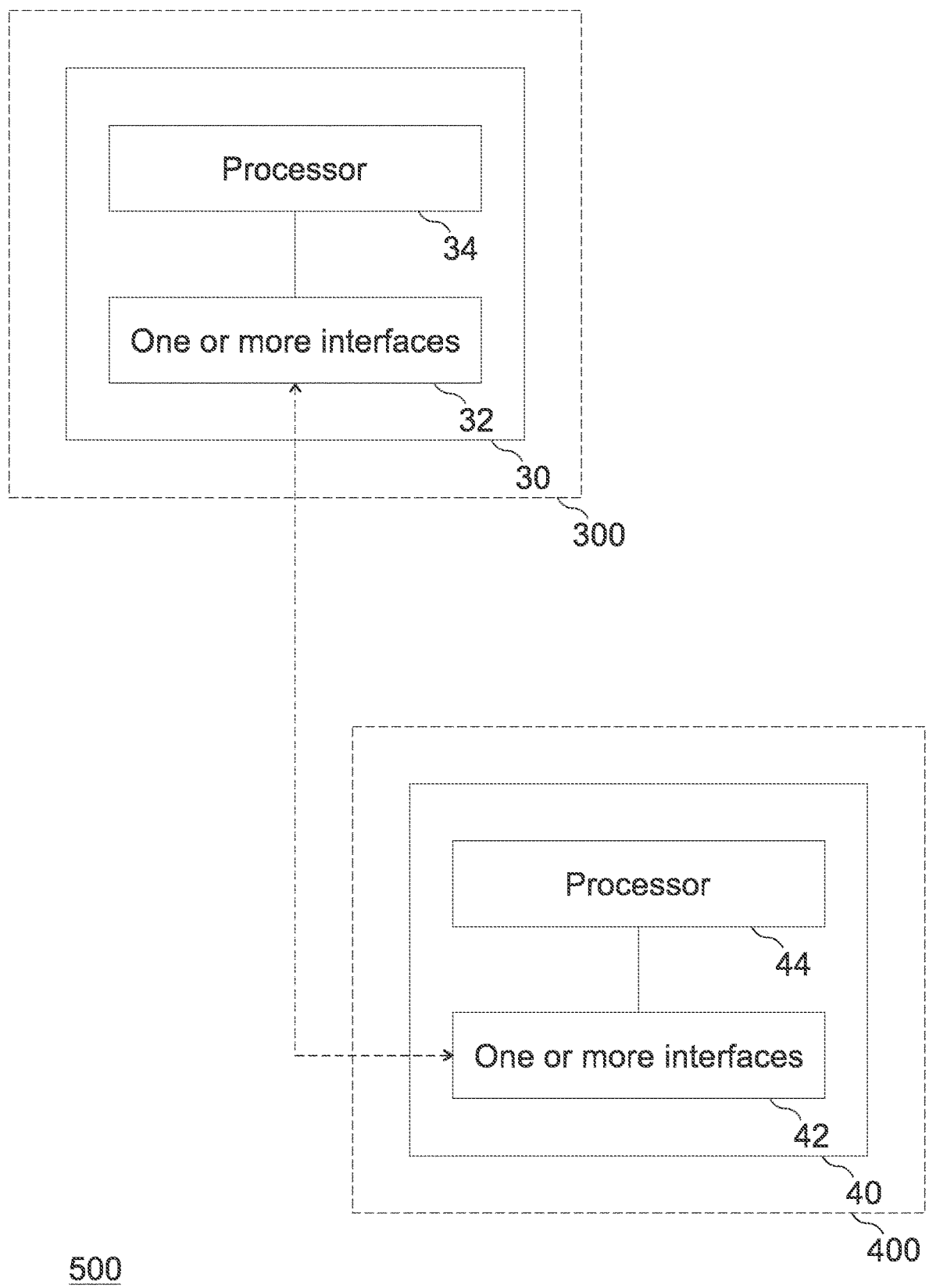
FIG. 3 shows an example of base band circuitry for user equipment, an example of user equipment, an example of base band circuitry for a base station, an example of a base station, and an example of a mobile communication system.

FIG. 3 shows an example of base band circuitry 30 for user equipment 300, an example of user equipment 300, an example of base band circuitry 40 for a base station 400, an example of a base station 400, and an example of a mobile communication system 500. The Baseband circuitry 30 for user equipment 300, UE, is configured to communicate in the mobile communication system 500. The base band circuitry comprises one or more interfaces 22, which are configured to communicate within the mobile communication system 500. The base band circuitry 30 further comprises a processor 34, which is configured to carry out the method 10 for the UE circuitry 30. The processor 34 is coupled to the one or more interfaces 32.

The baseband circuitry 40 for the base station 400 is configured to communicate in the mobile communication system 500. The base band circuitry 40 comprises one or more interfaces 42, which are configured to communicate within the mobile communication system 500. The base band circuitry 40 further comprises a processor 44, which is coupled to the one or more interfaces 42. The processor 44 is configured to carry out the method 20 for the base station circuitry 40.

FIG. 3 further illustrates an example of UE 300, which comprises the baseband circuitry 30, and an example of a base station 400, which comprises the baseband circuitry 40. Furthermore, FIG. 3 illustrates an example of a mobile communication system 500, which comprises at least the UE 300 and at least the base station 400. Examples of mobile communication systems 500 may comprise more than one UE 300 and more than one base station 400. The broken line arrow in FIG. 3 indicates communication between the base band circuitries 30, 40 using the respective interfaces 32, 42.

In embodiments or examples the one or more interfaces 32, 42 may correspond to any means for obtaining, receiving, transmitting or providing analog or digital signals or information, e.g. any connector, contact, pin, register, input port, output port, conductor, lane, etc. which allows providing or obtaining a signal or information. Such information may be communicated in terms of analog or digital signals, e.g. by means of messages, digits or blocks represented by digital or binary sequences. An interface may be wireless or wireline and it may be configured to communicate, i.e. transmit or receive signals, information with further internal or external components. The one or more interfaces 32, 42 may comprise or couple to further components to enable according communication in the mobile communication system or environment 500, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to payload or control data.

In examples the mobile communication system or network 500 may comprise any Radio Access Technology (RAT). Corresponding transceivers (for example mobile transceivers, user equipment, base stations, relay stations) in the network or system may, for example, operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High- Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TDCDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code Division Multiple Access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Public Land Mobile Telephony), MTD (Swedish abbreviation for Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others.

Examples may also be applied to different Single Carrier or OFDM flavors (CP-OFDM, SC-FDMA, SC-OFDM, filter bank-based multicarrier (FBMC), OFDMA) and in particular 3GPP NR (New Radio) by allocating the OFDM carrier data bit vectors to the corresponding symbol resources.

A base station 400 (which may be an access node, a network node, or a base station transceiver) can be operable to communicate with one or more active mobile transceivers or terminals and a base station transceiver can be located in or adjacent to a coverage area of another base station transceiver, e.g. a macro cell base station transceiver or small cell base station transceiver. Hence, examples may provide a mobile communication system comprising one or more mobile transceivers and one or more base station transceivers, wherein the base station transceivers may establish macro cells or small cells, as e.g. pico-, metro-, or femto cells. A mobile transceiver 300 or UE may correspond to a smartphone, a cell phone, user equipment, a laptop, a notebook, a personal computer, a Personal Digital Assistant (PDA), a Universal Serial Bus (USB)-stick, a car. A mobile transceiver may also be referred to as UE or mobile in line with the 3GPP terminology.

A base station 400 can be located in the fixed or stationary part of the network or system. A base station 400 may correspond to a remote radio head, a transmission point, an access point or access node, a macro cell, a small cell, a micro cell, a femto cell, a metro cell. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station 400 or base station transceiver 400 may correspond to a NodeB, an eNodeB, a gNodeB, a ngNodeB, a Base Transceiver Station (BTS), an access point, a remote radio head, a transmission point, which may be further divided into a remote unit and a central unit. Further details on the implementation and functional subdivision or breakdown of a mobile communication system 400 will be provided in the sequel.

Further details on example implementations of methods 10, 20, base band circuitry 30, 40, UE 300, base stations 400 and mobile communication system 500 will be provided subsequently.

In 3GPP new radio (NR) systems, beam management (BM) may refer to a set of L1/L2 procedures (Layer 1 and/or Layer 2 protocols) to acquire and maintain a set of transmission/reception point(s) (TRP(s) or TRxP(s)) and/or UE beams that can be used for downlink (DL) and uplink (UL) transmission/reception. BM refers to management, assignment or administration of antenna beams in a mobile communication system 500. Beams are generated using beamforming, in which one or more antennas are used to form a directionally focused transmission or reception characteristic. Aside from directional antennas antenna arrays may be used for this purpose.

BM may include beam determination, which may refer to TRxP(s) or UE ability to select of its own transmission (Tx)/reception (Rx) beam(s); beam measurement, which may refer to TRxP(s) or UE ability to measure characteristics of received beamformed signals; beam reporting, which may refer the UE ability to report information of beamformed signal(s) based on beam measurement; and beam sweeping, which may refer to operation(s) of covering a spatial area, with beams transmitted and/or received during a time interval in a predetermined manner.

A control channel resource set (CORESET) can be configured with K>1 (K being an integer) Transmission Configuration Indication (TCI) states, each of which is associated with a downlink (DL) Reference Signal (RS). A user equipment (UE) may be configured with a list of TCI states by Radio Resource Control (RRC) and/or Media Access Control (MAC) Control Element (CE) signaling. In some implementations, a UE can be configured up to M TCI-States (M being a positive integer) by higher layer signaling to decode PDSCH (Physical Downlink Shared Channel) according to a detected PDCCH (Physical Downlink Control Channel) with Downlink Control Information (DCI) intended for the UE and the given serving cell, where M may depend on the UE capability. Each configured TCI state includes one RS set TCI-RS-SetConfig. Each TCI-RS-SetConfig may include parameters for configuring quasi co-location relationship(s) between the RSs in the RS set and the demodulation reference signal (DM-RS) port group of the PDSCH. The RS set may include a reference to either one or two DL RSs and an associated quasi co-location type (QCL-Type) for each DL RS(s) configured by the higher layer parameter QCL-Type. For the case of two DL RSs, the QCL types shall not be the same, regardless of whether the references are to the same DL RS or different DL RSs. The quasi co-location types indicated to the UE are based on the higher layer parameter QCL-Type.

In the following examples the instruction is received on a Physical Downlink Control CHannel, PDCCH. The instruction is part of a Media Access Control-Control Element, MAC-CE, and comprises information on a Transmission Configuration Indication, TCI. The instruction indicates a TCI state of a Control Resource Set, CORESET.

Moreover, a MAC-CE can be used to activate one of K configured TCI states as the active TCI state for the CORESET. Since the activated TCI state of CORESET indicates the downlink beam direction of the PDCCH, MAC-CE based TCI state signaling essentially realizes the dynamic beam switching of the control channel. However, when MAC-CE signals the beam switching of CORESET, i.e. control channel thereof, erroneous reception of uplink acknowledgement (ACK) response would cause beam misalignment between gNB and UE. Such beam misalignment problem is illustrated by FIG. 4.

Figure 4:
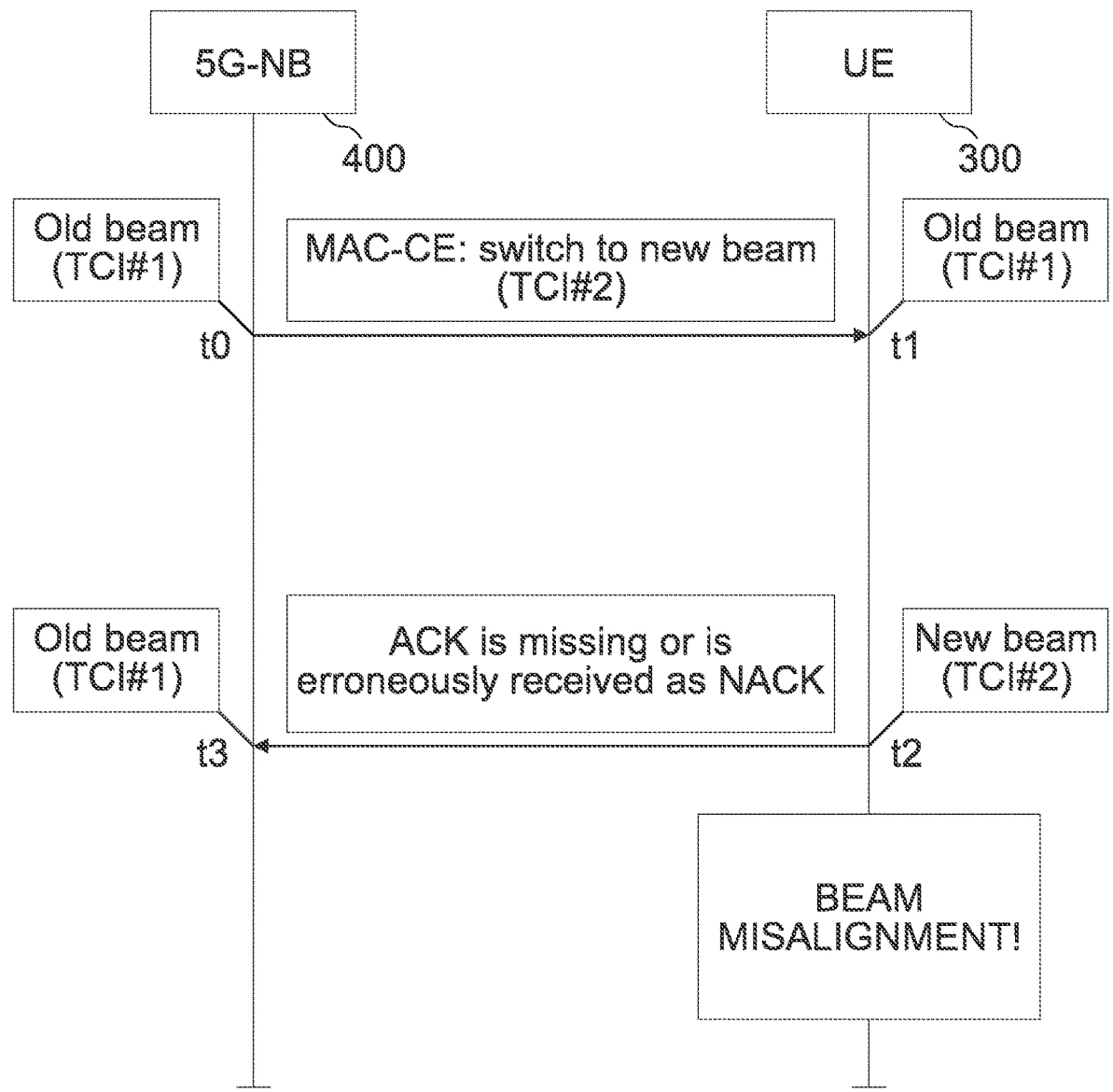
FIG. 4 shows an example of a communication sequence, which can result in beam misalignment.

FIG. 4 shows an example of a communication sequence, which can result in beam misalignment in a 5G or NR mobile communication system. FIG. 4 shows an example of a base station 400 (5G-NB) on the left hand side and an example of a UE 300 on the right hand side.

As shown in FIG. 4, at time t0, 5G-NB uses a MAC-CE to signal beam switching of a control channel from old beam TCI#1 to new beam TCI #2. At time t1, UE 300 correctly receives and decodes the MAC-CE of control channel beam switching. At time t2, UE 300 responds with an acknowledgement (ACK) to gNB 400, and starts to employ new beam TCI#2 to receive the future control channel. However, if at time t3, the ACK response is lost or incorrectly received as NACK at gNB 400, gNB 400 would assume that UE has not correctly received the previous MAC-CE about beam switching. As a result, gNB 400 would continue to use old beam TCI#1, e.g., to retransmit MAC-CE after a re-transmission timer has expired, while UE 300 has already switched to the new beam TCI#2. In this case, UE 300 would not be able to correctly receive control channel from gNB 400 due to the beam misalignment.

Embodiments or examples described herein provide mechanisms to resolve the above discussed beam misalignment issues, which may sometimes lead to deadlock problems. Examples therefore use the above method 10 on the UE 300 side and method 20 on the base station 400 side. The beam misalignment issue can be resolved particularly by monitoring 16 the radio resources on the first antenna beam for a repetition of the instruction (MAC-CE) after receiving the instruction (MAC-CE) on the UE 300 side. The UE 300 keeps monitoring the first antenna beam, even after reception of the MAC-CE. This may be done for a predefined time (timer based example) or by monitoring the first and the second antenna beam at the same time (cross monitoring example).

Embodiments or examples may include both timer-based and cross-CORESET TCI updates. Examples involving timer based TCI updates may enable a UE 300 to keep using an old (or current) TCI state in order to receive a retransmitted MAC-CE due to lost ACK or erroneously received negative ACK (NACK). Examples involving cross-CORESET TCI updates may resolve the temporary beam misalignment for CORESETs supporting dynamic beam switching by the assistance of MAC-CE scheduled in CORESET without dynamic beam switching.

Figure 5:
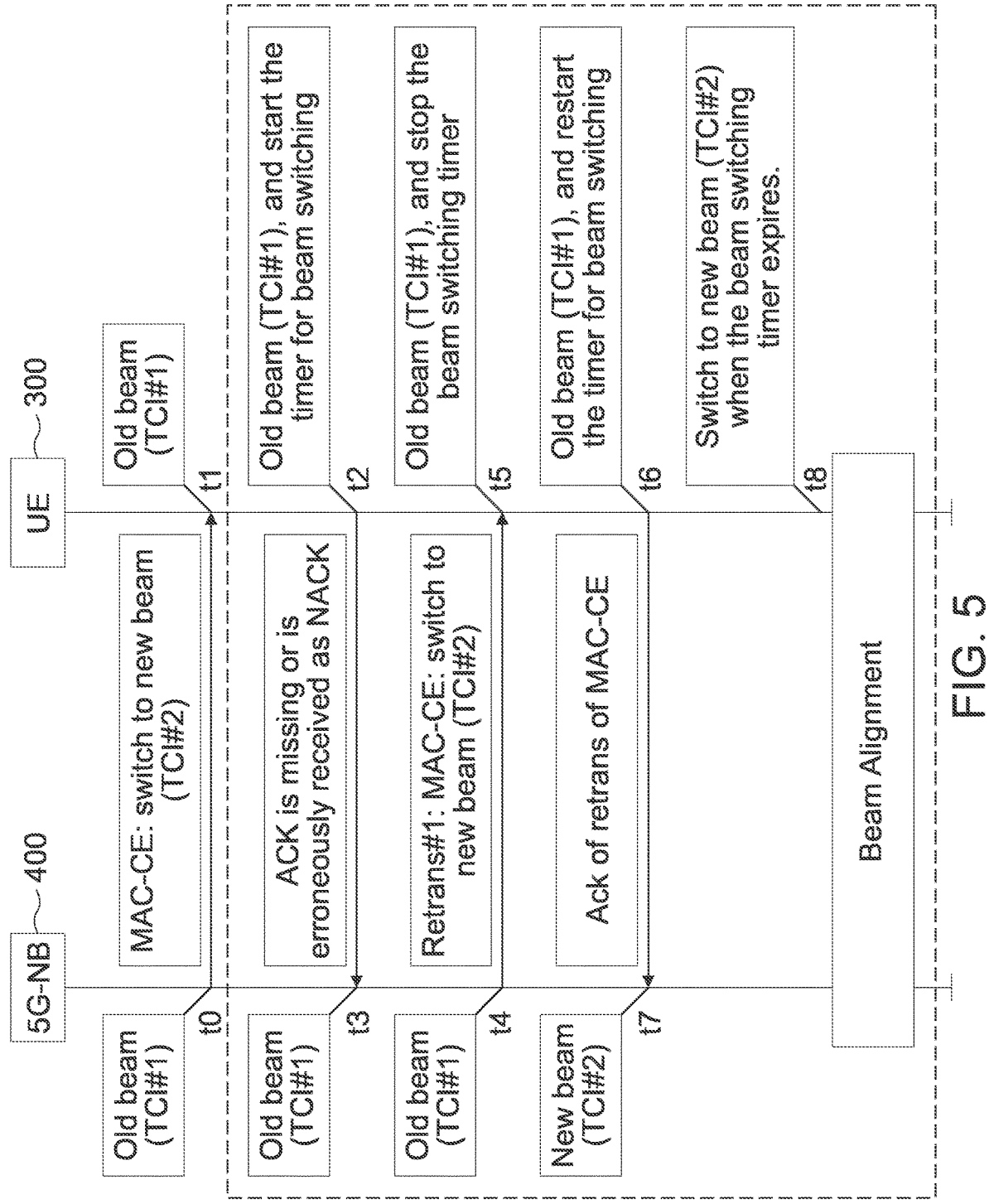
FIG. 5 shows another example of a communication sequence, which can resolve beam misalignment.

In the following a time-based examples will be detailed first. In such an example the monitoring 16 is time limited for a predefined time in the above method 10. For example, the method 10 comprises starting a beam switching timer after the instruction (MAC-CE) is received using the radio resources on the first antenna beam and enabling reception using the radio resources on the second antenna beam after the beam switching timer expires. The timer based TCI update examples may be used to mitigate the beam misalignment problem illustrated by FIG. 4; an example of such an embodiment or example is shown by FIG. 5. FIG. 5 shows an example of a communication sequence, which can resolve beam misalignment. Similar to FIG. 4, FIG. 5 shows a 5G-NB 400 on the left and a UE 300 on the right. Specifically in this example, a (beam switching) timer is used, when UE 300 receives the beam switching MAC-CE from the gNB 400, and the UE 300 switches to the new TCI state for the CORESET when the timer expires.

On the base station 400 side, the method 20 comprises transmitting 28 of the control data using the radio resources on the second antenna beam being carried out at a predefined time after repeating 26 transmitting the instruction or after receiving the acknowledgement. The method 20 may hence also use a beam switching timer. The method 20 may comprise starting a beam switching timer after the instruction (MAC-CE) is transmitted using the radio resources on the first antenna beam or after receiving the acknowledgment, and starting transmitting the control data using the radio resources on the second antenna beam after the timer expires. In examples, the time for starting transmission on the new beam may hence be defined relative to the transmission of the MAC-CE or relative to the reception of the ACK.

The main steps of a timer based TCI update procedure in an example is illustrated by FIG. 5 and can be summarized as follows.

Step 1: A timer used for updating CORESET TCI state to realize beam switching, e.g., called "Timer-CoresetTciUpdate", can be configured to the UE 300 by RRC signaling when multiple TCI states are associated with a configured CORESET. This timer can be configured in either UE-specific or CORESET-specific manner. In case of CORESET-specific configuration, different CORESETs with multiple TCI states may be configured with different values for the Timer-CoresetTciUpdate.

Step 2: At time t0, gNB 400 sends a PDCCH transmitted with old beam TCI#1 to schedule a MAC-CE updating the CORESET TCI state to the UE 300. At time t1, UE 300 correctly receives and decodes the PDCCH and scheduled MAC-CE updating TCI state.

Step 3: At time t2, UE 300 sends ACK response regarding the received MAC-CE to gNB 400, and starts the timer "Timer-CoresetTciUpdate". Before the timer expires, UE 300 continues to use old beam TCI#1 associated DL receive beam for the PDCCH reception from the CORESET. The value of the timer should be set to a proper value to provide a sufficient time window to enable several, e.g. 2, 3, or 5 retransmissions of MAC-CE signaling in case of poor data link transmission reliability.

Step 4: At time t3 when gNB 400 expects ACK/NACK response from the UE 300 for the reception of previously transmitted MAC-CE signaling TCI state update, if gNB 400 receives nothing or NACK response from UE 300 for the reception of MAC-CE, gNB 400 continues to use old beam TCI#1 for all PDCCHs in the CORESET.

Step 5: At time t4, gNB 400 sends the PDCCH using old beam TCI#1 to schedule a retransmission of beam switching MAC-CE. At time t5, UE 300 correctly receives the retransmitted MAC-CE updating the TCI state, and stops the timer "Timer-CoresetTciUpdate".

Step 6: At time t6, UE 300 sends the ACK response about the correctly received MAC-CE to gNB 400, and restarts the timer "Timer-CoresetTciUpdate". For the method 10, this corresponds to restarting the beam switching timer if a repetition of the instruction (MAC-CE) is received during the predefined time. At the gNB 400, the beam switching timer is re-started after repeating transmitting the instruction (MAC-CE). At time t7, gNB 400 correctly receives the ACK feedback from UE 300 (on the old beam), and starts to use new beam TCI#2 for the future PDCCH transmission from the CORESET. It should be noted that upon receiving the ACK from UE 300, gNB 400 shall not immediately transmit PDCCH with new beam TCI#2 to UE 300 cause UE 300 has not switched to new beam when its timer "Timer-Coreset-TciUpdate" is still running. As such, gNB 400 shall wait until UE's timer expires to start PDCCH transmission with new beam TCI#2. Therefore timers on the UE 300 and gNB 400 sides should be adapted to each other.

Step 7: At time t8, when the timer expires, UE 300 switches its DL receive beam corresponding to the new transmit beam TCI#2 for the PDCCH reception. From time t8 onwards, beam alignment between gNB 400 and UE 300 is achieved.

In the following further examples will be detailed, which use cross reception of the first and the second antenna beams at least for a predefined time. When several CORESETs are configured to a UE 300, cross-CORESET TCI update MAC-CE signaling can be used to tackle the beam misalignment in FIG. 4 as well. In cross-CORESET TCI update methods 10, 20, the MAC-CE scheduled from the CORESET x can signal the TCI state update of CORESET y. To this end, the MAC-CE signaling the updated TCI state for another CORESET shall also indicate the ID of CORESET, whose TCI state is updated. The exemplary information field format of MAC-CE for TCI state update can be given as follows: TCI state update field of MAC-CE:={CORESET ID; New TCI state}.

The cross-CORESET TCI update embodiments or examples may be particularly efficient when multiple CORESETs are configured to a UE 300, and one of them, e.g., the one with the lowest CORESET ID, is configured with only one TCI state. In this case, the CORESET configured with only one TCI state can be considered as the default CORESET, and can be used to update the TCI state of other CORESETs with multiple TCI states configured and only one active TCI state at a given time. In some examples the radio resources on the first antenna beam are configured as default control signaling resource.

Figure 6:
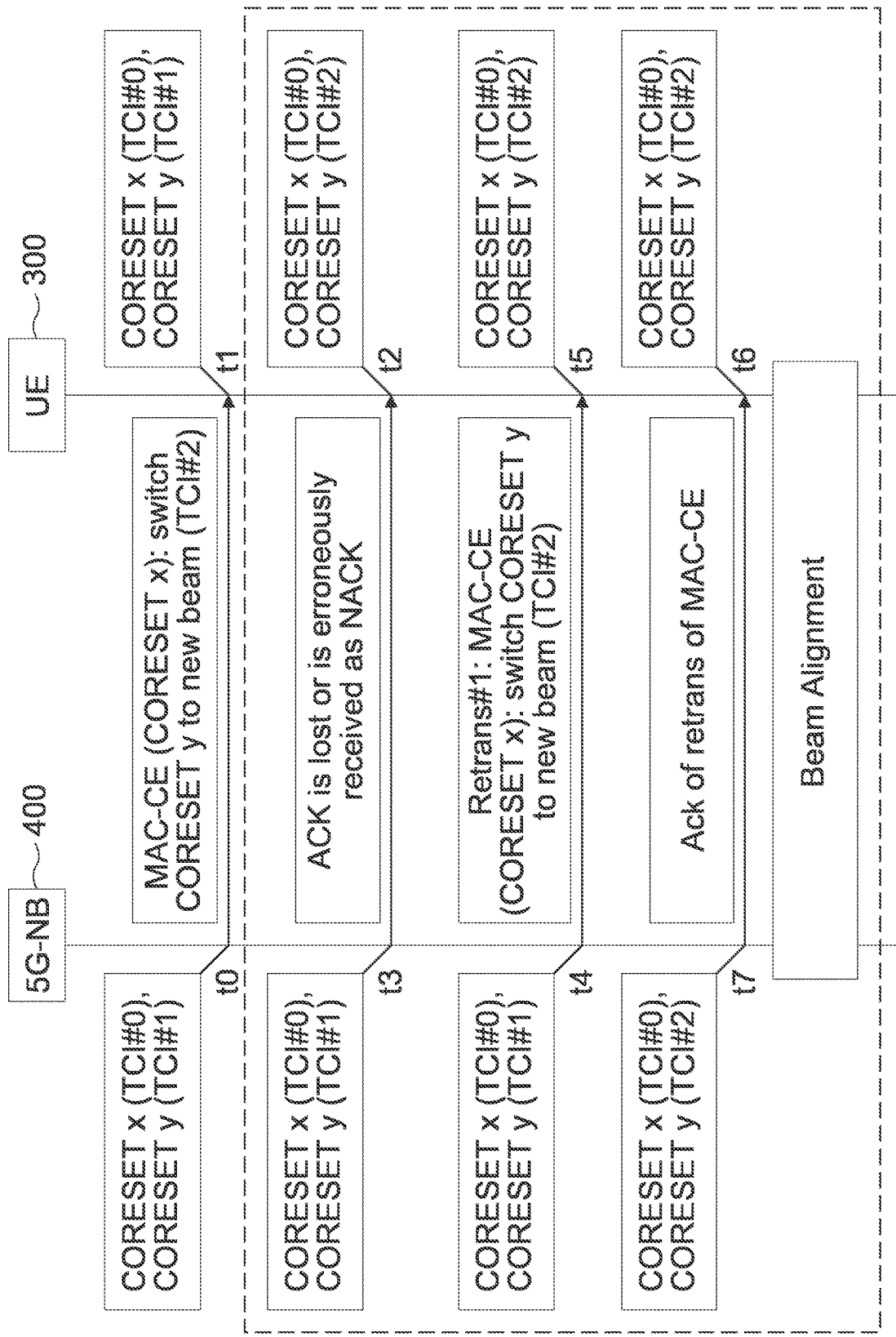
FIG. 6 shows another example of a communication sequence, which can resolve beam misalignment.

In case of cross-CORESET TCI update, no timer may be necessary for the TCI state switching. An example of such embodiment is illustrated by FIG. 6. FIG. 6 shows another example of a communication sequence, which can resolve beam misalignment. In line with the above FIGS. 4 and 5, FIG. 6 shows a 5G-NB 400 on the left and a UE 300 on the right.

As shown by FIG. 6, at time t0, MAC-CE scheduled in CORESET x by the base station 400 signals the TCI update from TCI#1 to TCI#2 for CORESET y to the UE 300. At time t2, UE 300 sends the ACK response to gNB 400 about the correct reception of the MAC-CE. From time t2 onwards, UE 300 applies the receive beam for CORESET y corresponding to new beam TCI#2. However, ACK is lost or NACK is received at time t3 at gNB 400, and at time t4 gNB 400 sends the retransmitted MAC-CE scheduled in CORESET x to UE 300. At time t7, upon the reception of ACK from UE 300, gNB 400 switches the DL beam of CORESET y from TCI#1 to TCI#2. As a result, from time t7 onwards, beam alignment is achieved between gNB 400 and UE 300 for CORESET y. With the assistance of default CORESET, e.g., CORESET x in FIG. 6, temporary beam misalignment for CORESET y from time t2 to t7 is smoothly resolved by the cross-CORESET TCI update mechanism.

In examples, the method 10 may comprise enabling reception using the radio resources on the second antenna beam after reception of the instruction as indicated in FIG. 6. The method may further comprise enabling reception using the radio resources on the first antenna beam (TCI#1) and using the radio resources on the second antenna beam (TCI#2) after reception of the instruction. At the base station 400, the method 20 may further comprise transmitting using the radio resources on the first antenna beam and using the radio resources on the second antenna beam after reception of the acknowledgement.

Figure 7:
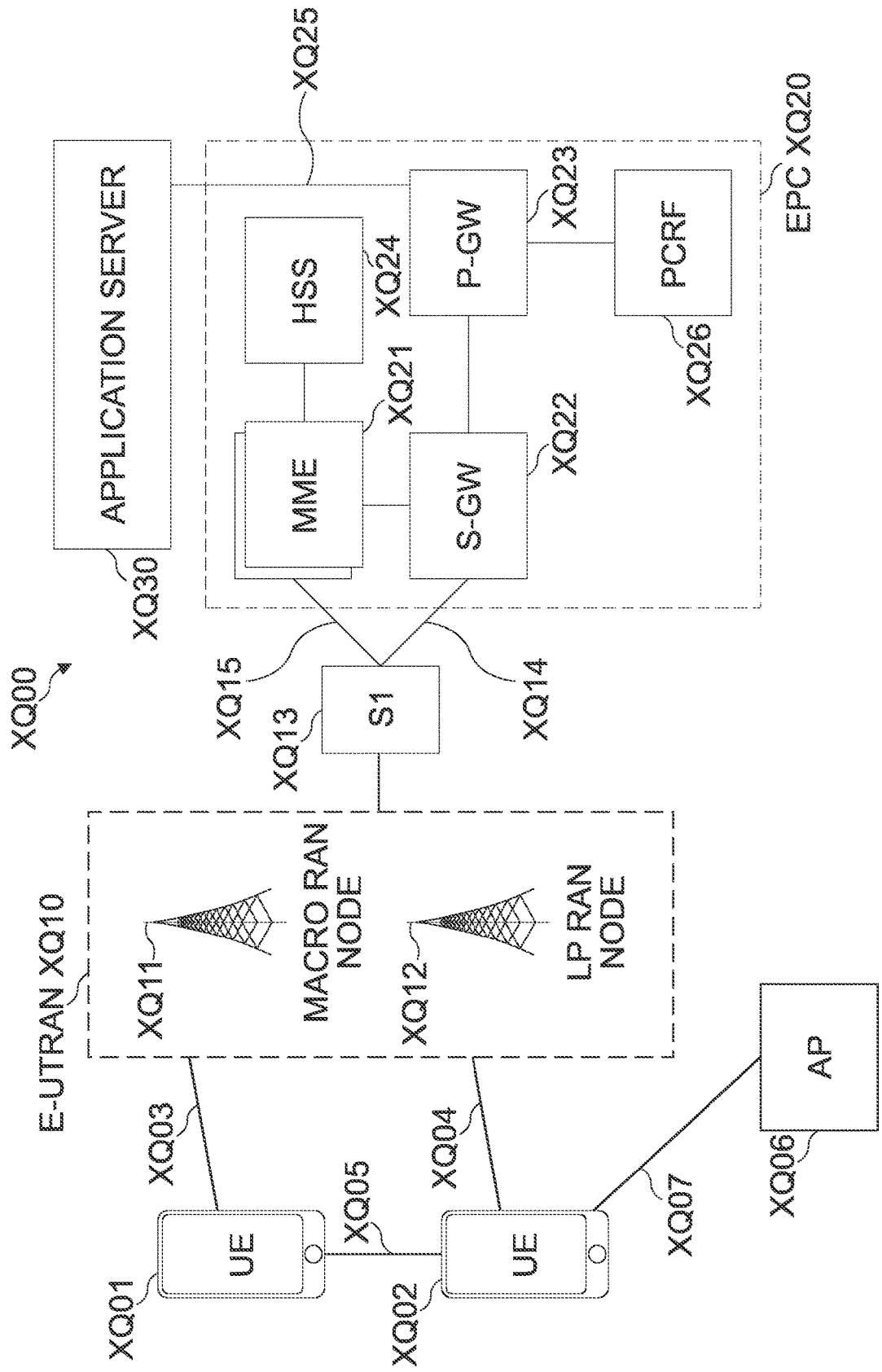
FIG. 7 shows another example of a mobile communication system.

FIG. 7 shows another example of a mobile communication system 500. FIG. 7 illustrates an architecture of a system XQ00, 500 of a network in accordance with some embodiments. The system XQ00 is shown to include a user equipment 300 (UE) XQ01 and a UE XQ02. The UEs XQ01 and XQ02 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs XQ01 and XQ02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XQ01 and XQ02 may be configured to connect, e.g., communicatively couple, with a radio access network (RAN) XQ10—the RAN XQ10 may be, for example, an Evolved Universal Mobile Telecommunications System (UMTS) Terrestrial Radio Access Network (E-UTRAN), a NextGen RAN (NG RAN), or some other type of RAN. The UEs XQ01 and XQ02 utilize connections XQ03 and XQ04, respectively, each of which comprises a physical communications interface or layer (discussed in further detail infra); in this example, the connections XQ03 and XQ04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XQ01 and XQ02 may further directly exchange communication data via a ProSe interface XQ05. The ProSe interface XQ05 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface XQ05 may be used in vehicular applications and communications technologies, which are often referred to as V2X systems. V2X is a mode of communication where UEs (for example, UEs XQ01, XQ02) communicate with each other directly over the PC5/SL interface 105 and can take place when the UEs XQ01, XQ02 are served by RAN nodes XQ11, XQ12 or when one or more UEs are outside a coverage area of the RAN XS10. V2X may be classified into four different types: vehicle-to-vehicle (V2V), vehicle-to-infrastructure (V2I), vehicle-to-network (V2N), and vehicle-to-pedestrian (V2P). These V2X applications can use "cooperative awareness" to provide more intelligent services for end-users. For example, vUEs XQ01, XQ02, RAN nodes XQ11, XQ12, application servers XQ30, and pedestrian UEs XQ01, XQ02 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs XQ01, XQ02 may be implemented/employed as Vehicle Embedded Communications Systems (VECS) or vUEs.

The UE XQ02 is shown to be configured to access an access point (AP) XQ06 (also referred to as also referred to as "WLAN node XQ06", "WLAN XQ06", "WLAN Termination XQ06" or "WT XQ06" or the like) via connection XQ07. The connection XQ07 can comprise a local wireless connection, such as a connection consistent with any IEEE 802.11 protocol, wherein the AP XQ06 would comprise a wireless fidelity (WiFi®) router. In this example, the AP XQ06 is shown to be connected to the Internet without connecting to the core network of the wireless system (described in further detail below). In various embodiments, the UE XQ02, RAN XQ10, and AP XQ06 may be configured to utilize LTE-WLAN aggregation (LWA) operation and/or WLAN LTE/WLAN Radio Level Integration with IPsec Tunnel (LWIP) operation. LWA operation may involve the UE XQ02 in RRC_CONNECTED is configured by a RAN node XQ11, XQ12 to utilize radio resources of LTE and WLAN. LWIP operation may involve the UE XQ02 using WLAN radio resources (e.g., connection XQ07) via Internet Protocol Security (IPsec) protocol tunneling to authenticate and encrypt packets (e.g., internet protocol (IP) packets) sent over the connection XQ07. IPsec tunneling may include encapsulating entirety of original IP packets and adding a new packet header thereby protecting the original header of the IP packets.

The RAN XQ10 can include one or more access nodes that enable the connections XQ03 and XQ04. These access nodes (ANs) can be referred to as base stations (BSs), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN XQ10 may include one or more RAN nodes for providing macrocells, e.g., macro RAN node XQ11, and one or more RAN nodes for providing femtocells or picocells (e.g., cells having smaller coverage areas, smaller user capacity, or higher bandwidth compared to macrocells), e.g., low power (LP) RAN node XQ12.

Any of the RAN nodes XQ11 and XQ12 can terminate the air interface protocol and can be the first point of contact for the UEs XQ01 and XQ02. In some embodiments, any of the RAN nodes XQ11 and XQ12 can fulfill various logical functions for the RAN XQ10 including, but not limited to, radio network controller (RNC) functions such as radio bearer management, uplink and downlink dynamic radio resource management and data packet scheduling, and mobility management.

In accordance with some embodiments, the UEs XQ01 and XQ02 can be configured to communicate using Orthogonal Frequency-Division Multiplexing (OFDM) communication signals with each other or with any of the RAN nodes XQ11 and XQ12 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XQ11 and XQ12 to the UEs XQ01 and XQ02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs XQ01 and XQ02. The physical downlink control channel (PDCCH) may carry information about the transport format and resource allocations related to the PDSCH channel, among other things. It may also inform the UEs XQ01 and XQ02 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes XQ11 and XQ12 based on channel quality information fed back from any of the UEs XQ01 and XQ02. The downlink resource assignment information may be sent on the PDCCH used for (e.g., assigned to) each of the UEs XQ01 and XQ02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN XQ10 is shown to be communicatively coupled to a core network (CN) XQ20—via an S1 interface XQ13. In embodiments, the CN XQ20 may be an evolved packet core (EPC) network, a NextGen Packet Core (NPC) network, or some other type of CN. In this embodiment the S1 interface XQ13 is split into two parts: the S1-U interface XQ14, which carries traffic data between the RAN nodes XQ11 and XQ12 and the serving gateway (SGW) XQ22, and the S1-mobility management entity (MME) interface XQ15, which is a signaling interface between the RAN nodes XQ11 and XQ12 and MMES XQ21.

In this embodiment, the CN XQ20 comprises the MMEs XQ21, the S-GW XQ22, the Packet Data Network (PDN) Gateway (P-GW) XQ23, and a home subscriber server (HSS) XQ24. The MMES XQ21 may be similar in function to the control plane of legacy Serving General Packet Radio Service (GPRS) Support Nodes (SGSN). The MMEs XQ21 may manage mobility aspects in access such as gateway selection and tracking area list management. The HSS XQ24 may comprise a database for network users, including subscription-related information to support the network entities' handling of communication sessions. The CN XQ20 may comprise one or several HSSs XQ24, depending on the number of mobile subscribers, on the capacity of the equipment, on the organization of the network, etc. For example, the HSS XQ24 can provide support for routing/roaming, authentication, authorization, naming/addressing resolution, location dependencies, etc.

The S-GW XQ22 may terminate the S1 interface XQ13 towards the RAN XQ10, and routes data packets between the RAN XQ10 and the CN XQ20. In addition, the S-GW XQ22 may be a local mobility anchor point for inter-RAN node handovers and also may provide an anchor for inter-3GPP mobility. Other responsibilities may include lawful intercept, charging, and some policy enforcement.

The P-GW XQ23 may terminate an SGi interface toward a PDN. The P-GW XQ23 may route data packets between the EPC network XQ23 and external networks such as a network including the application server XQ30 (alternatively referred to as application function (AF)) via an Internet Protocol (IP) interface XQ25. Generally, the application server XQ30 may be an element offering applications that use IP bearer resources with the core network (e.g., UMTS Packet Services (PS) domain, LTE PS data services, etc.). In this embodiment, the P-GW XQ23 is shown to be communicatively coupled to an application server XQ30 via an IP communications interface XQ25. The application server XQ30 can also be configured to support one or more communication services (e.g., Voice-over-Internet Protocol (VoIP) sessions, PTT sessions, group communication sessions, social networking services, etc.) for the UEs XQ01 and XQ02 via the CN XQ20.

The P-GW XQ23 may further be a node for policy enforcement and charging data collection. Policy and Charging Enforcement Function (PCRF) XQ26 is the policy and charging control element of the CN XQ20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF XQ26 may be communicatively coupled to the application server XQ30 via the P-GW XQ23. The application server XQ30 may signal the PCRF XQ26 to indicate a new service flow and select the appropriate Quality of Service (QoS) and charging parameters. The PCRF XQ26 may provision this rule into a Policy and Charging Enforcement Function (PCEF) (not shown) with the appropriate traffic flow template (TFT) and QoS class of identifier (QCI), which commences the QoS and charging as specified by the application server XQ30.

Figure 8:
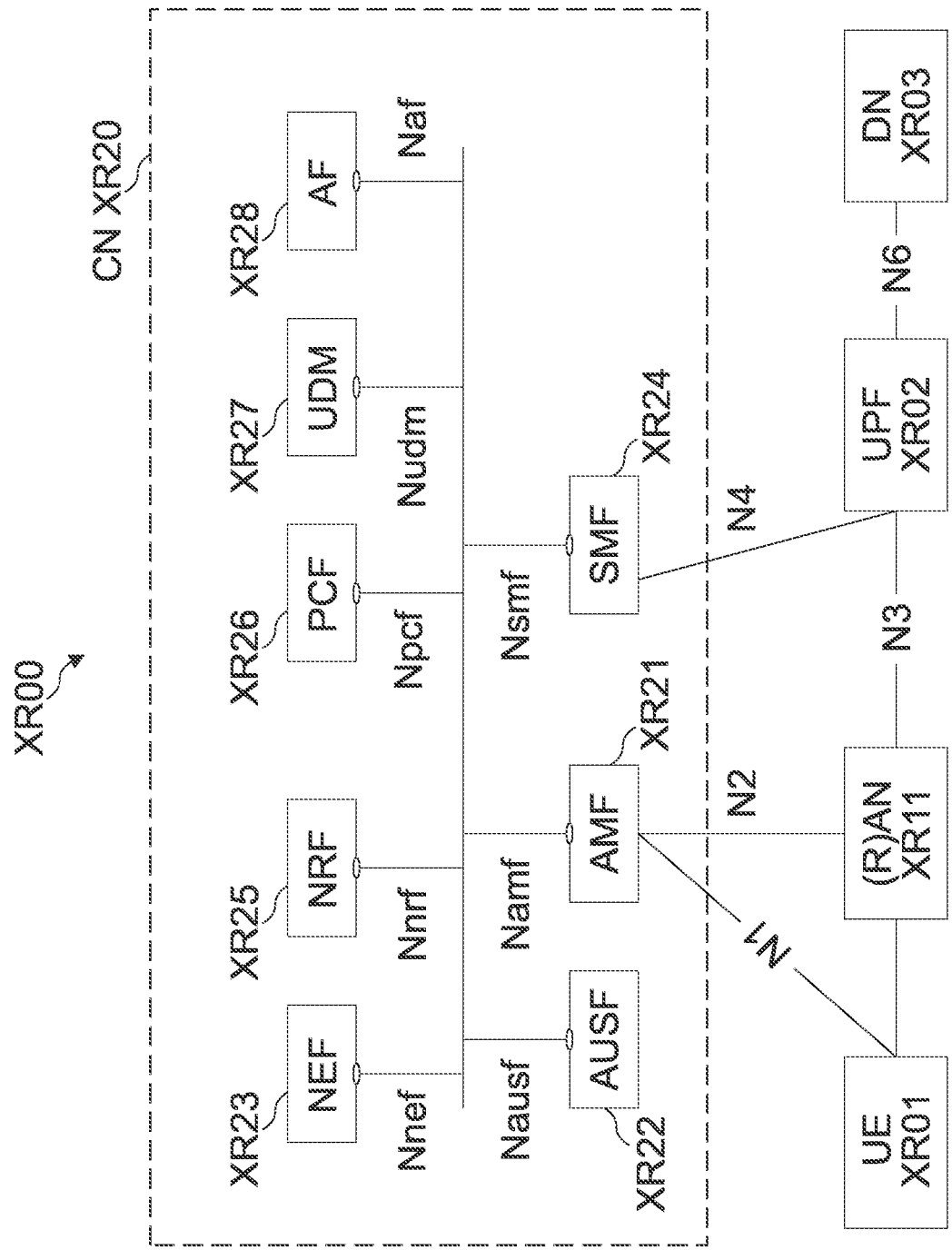
FIG. 8 shows an architecture example of a mobile communication system.

FIG. 8 shows an architecture example of a mobile communication system 500. Fig. XR illustrates an architecture of a system XR00, 500 of a network in accordance with some embodiments. The system XR00 is shown to include a UE XR01, which may be the same or similar to UEs XQ01 and XQ02 discussed previously; a RAN node XR11, which may be the same or similar to RAN nodes XQ11 and XQ12 discussed previously; a User Plane Function (UPF) XR02; a Data network (DN) XR03, which may be, for example, operator services, Internet access or 3rd party services; and a 5G Core Network (5GC or CN) XR20.

The CN XR20 may include an Authentication Server Function (AUSF) XR22; a Core Access and Mobility Management Function (AMF) XR21; a Session Management Function (SMF) XR24; a Network Exposure Function (NEF) XR23; a Policy Control function (PCF) XR26; a Network Function (NF) Repository Function (NRF) XR25; a Unified Data Management (UDM) XR27; and an Application Function (AF) XR28. The CN XR20 may also include other elements that are not shown, such as a Structured Data Storage network function (SDSF), an Unstructured Data Storage network function (UDSF), and the like.

The UPF XR02 may act as an anchor point for intra-RAT and inter-RAT mobility, an external PDU session point of interconnect to DN XR03, and a branching point to support multi-homed PDU session. The UPF XR02 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF XR02 may include an uplink classifier to support routing traffic flows to a data network. The DN XR03 may represent various network operator services, Internet access, or third party services. NY XR03 may include, or be similar to application server XQ30 discussed previously.

The AUSF XR22 may store data for authentication of UE XR01 and handle authentication related functionality. The AUSF XR22 may facilitate a common authentication framework for various access types.

The AMF XR21 may be responsible for registration management (e.g., for registering UE XR01, etc.), connection management, reachability management, mobility management, and lawful interception of AMF-related events, and access authentication and authorization. AMF XR21 may provide transport for SM messages between and SMF XR24, and act as a transparent proxy for routing SM messages. AMF XR21 may also provide transport for short message service (SMS) messages between UE XR01 and an SMS function (SMSF) (not shown by Fig. XR). AMF XR21 may act as Security Anchor Function (SEA), which may include interaction with the AUSF XR22 and the UE XR01, receipt of an intermediate key that was established as a result of the UE XR01 authentication process. Where USIM based authentication is used, the AMF XR21 may retrieve the security material from the AUSF XR22. AMF XR21 may also include a Security Context Management (SCM) function, which receives a key from the SEA that it uses to derive access-network specific keys. Furthermore, AMF XR21 may be a termination point of RAN CP interface (N2 reference point), a termination point of NAS (N1) signalling, and perform NAS ciphering and integrity protection.

AMF XR21 may also support NAS signalling with a UE XR01 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE XR01 and AMF XR21, and relay uplink and downlink user-plane packets between the UE XR01 and UPF XR02. The N3IWF also provides mechanisms for IPsec tunnel establishment with the UE XR01.

The SMF XR24 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF XR24 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN.

The NEF XR23 may provide means for securely exposing the services and capabilities provided by 3GPP network functions for third party, internal exposure/re-exposure, Application Functions (e.g., AF XR28), edge computing or fog computing systems, etc. In such embodiments, the NEF XR23 may authenticate, authorize, and/or throttle the AFs. NEF XR23 may also translate information exchanged with the AF XR28 and information exchanged with internal network functions. For example, the NEF XR23 may translate between an AF-Service-Identifier and an internal 5GC information. NEF XR23 may also receive information from other network functions (NFs) based on exposed capabilities of other network functions. This information may be stored at the NEF XR23 as structured data, or at a data storage NF using a standardized interfaces. The stored information can then be re-exposed by the NEF XR23 to other NFs and AFs, and/or used for other purposes such as analytics.

The NRF XR25 may support service discovery functions, receive NF Discovery Requests from NF instances, and provide the information of the discovered NF instances to the NF instances. NRF XR25 also maintains information of available NF instances and their supported services.

The PCF XR26 may provide policy rules to control plane function(s) to enforce them, and may also support unified policy framework to govern network behaviour. The PCF XR26 may also implement a front end (FE) to access subscription information relevant for policy decisions in a UDR of UDM XR27.

The UDM XR27 may handle subscription-related information to support the network entities' handling of communication sessions, and may store subscription data of UE XR01. The UDM XR27 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF XR26. UDM XR27 may also support SMS management, wherein an SMS-FE implements the similar application logic as discussed previously.

The AF XR28 may provide application influence on traffic routing, access to the Network Capability Exposure (NCE), and interact with the policy framework for policy control. The NCE may be a mechanism that allows the 5GC and AF XR28 to provide information to each other via NEF XR23, which may be used for edge computing implementations. In such implementations, the network operator and third party services may be hosted close to the UE XR01 access point of attachment to achieve an efficient service delivery through the reduced end-to-end latency and load on the transport network. For edge computing implementations, the 5GC may select a UPF XR02 close to the UE XR01 and execute traffic steering from the UPF XR02 to DN XR03 via the N6 interface. This may be based on the UE subscription data, UE location, and information provided by the AF XR28. In this way, the AF XR28 may influence UPF (re)selection and traffic routing. Based on operator deployment, when AF XR28 is considered to be a trusted entity, the network operator may permit AF XR28 to interact directly with relevant NFs.

As discussed previously, the CN XR20 may include an SMSF, which may be responsible for SMS subscription checking and verification, and relaying SM messages to/from the UE XR01 to/from other entities, such as an SMS-GMSC/IWMSC/SMS-router. The SMS may also interact with AMF XR21 and UDM XR27 for notification procedure that the UE XR01 is available for SMS transfer (e.g., set a UE not reachable flag, and notifying UDM XR27 when UE XR01 is available for SMS).

The system XR00 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system XR00 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN XR20 may include an Nx interface, which is an inter-CN interface between the MME (e.g., MME XQ21) and the AMF XR21 in order to enable interworking between CN XR20 and CN XQ20.

Although not shown by FIG. 8, system XR00 may include multiple RAN nodes XR11 wherein an Xn interface is defined between two or more RAN nodes XR11 (e.g., gNBs and the like) that connecting to 5GC XR20, between a RAN node XR11 (e.g., gNB) connecting to 5GC XR20 and an eNB (e.g., a RAN node XQ11 of Fig. XQ), and/or between two eNBs connecting to 5GC XR20.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE XR01 in a connected mode (e.g., CM-CONNECTED) including functionality to manage the UE mobility for connected mode between one or more RAN nodes XR11. The mobility support may include context transfer from an old (source) serving RAN node XR11 to new (target) serving RAN node XR11; and control of user plane tunnels between old (source) serving RAN node XR11 to new (target) serving RAN node XR11.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
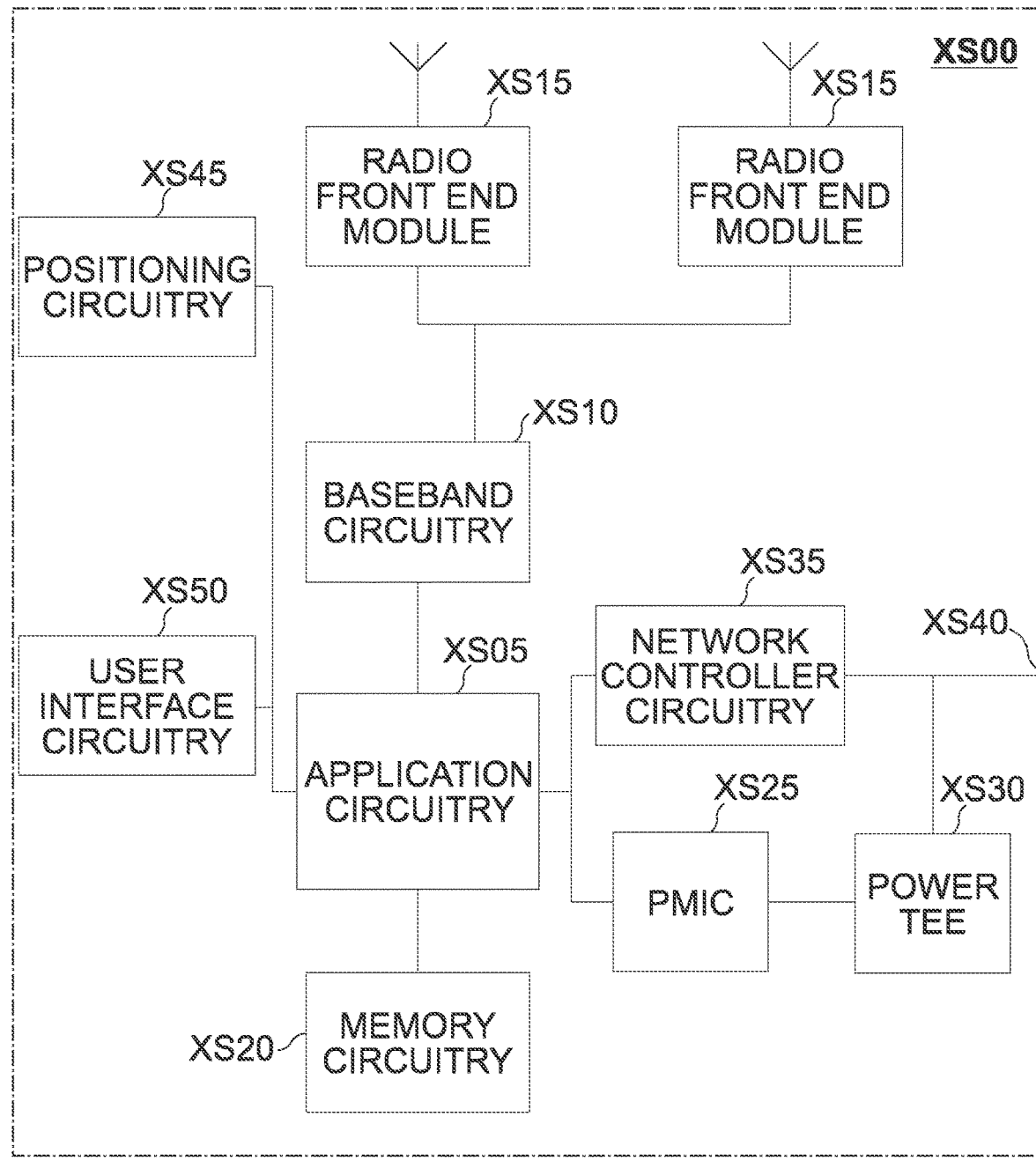
FIG. 9 shows an example of infrastructure equipment.

FIG. 9 shows an example of infrastructure equipment. FIG. 9 illustrates an example of infrastructure equipment XS00 in accordance with various embodiments. The infrastructure equipment XS00 (or "system XS00") may be implemented as a base station, radio head, RAN node, etc., such as the RAN nodes XQ11 and XQ12, and/or AP XQ06 shown and described previously. In other examples, the system XS00 could be implemented in or by a UE. The system XS00 may include one or more of application circuitry XS05, baseband circuitry XS10, one or more radio front end modules XS15, memory XS20, power management integrated circuitry (PMIC) XS25, power tee circuitry XS30, network controller XS35, network interface connector XS40, satellite positioning circuitry XS45, and user interface XS50. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

Application circuitry XS05 may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry XS05 may include one or more Intel Pentium®, Core®, or Xeon® processor(s); Advanced Micro Devices (AMD) Ryzen® processor(s), Accelerated Processing Units (APUs), or Epyc® processors;

and/or the like. In some embodiments, the system XS00 may not utilize application circuitry XS05, and instead may include a special-purpose processor/controller to process IP data received from an EPC or 5GC, for example.

User interface circuitry XS50 may include one or more user interfaces designed to enable user interaction with the system XS00 or peripheral component interfaces designed to enable peripheral component interaction with the system XS00. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

Additionally or alternatively, application circuitry XS05 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XS05 may comprise logic blocks or logic fabric including and other interconnected resources that may be programmed to perform various functions, such as the procedures, methods, functions, etc. of the various embodiments discussed herein. In such embodiments, the circuitry of application circuitry XS05 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry XS10 may be implemented, for example, as a solder-down substrate including one or more integrated circuits, a single packaged integrated circuit soldered to a main circuit board or a multi-chip module containing two or more integrated circuits. Although not shown, baseband circuitry XS10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XS10 may include protocol processing circuitry with one or more instances of control circuitry (not shown) to provide control functions for the digital baseband circuitry and/or radio frequency circuitry (for example, the radio front end modules XS15).

The radio front end modules (RFEMs) XS15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XS15. The RFEMs XS15 may incorporate both millimeter wave antennas and sub-millimeter wave antennas.

The memory circuitry XS20 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry XS20 may be implemented as one or more of solder down packaged integrated circuits, socketed memory modules and plug-in memory cards.

The PMIC XS25 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry XS30 may provide for electrical power drawn from a network cable to provide both power supply and data connectivity to the infrastructure equipment XS00 using a single cable.

The network controller circuitry XS35 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment XS00 using a physical connection, which may be electrical (commonly referred to as a "copper interconnect"), optical, or wireless. The network controller circuitry XS35 may include one or more dedicated processors and/or FPGAs to communicate using one or more of the aforementioned protocol. In some implementations, the network controller circuitry XS35 may include multiple controllers to provide connectivity to other networks using the same or different protocols.

The positioning circuitry XS45, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppier Orbitography and Radio-positioning Integrated by Satellite (DORIS), etc.), or the like. The positioning circuitry XS45 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry XS45 and/or positioning circuitry implemented by UEs XQ01, XQ02, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry XS45 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry XS45 may provide data to application circuitry XS05 which may include one or more of position data or time data. Application circuitry XS05 may use the time data to synchronize operations with other radio base stations (e.g., RAN nodes XQ11, XQ12, XR11 or the like).

The components shown by Fig. XS may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I$^2$C interface, an SPI interface, point to point interfaces, and a power bus, among others.

Figure 10:
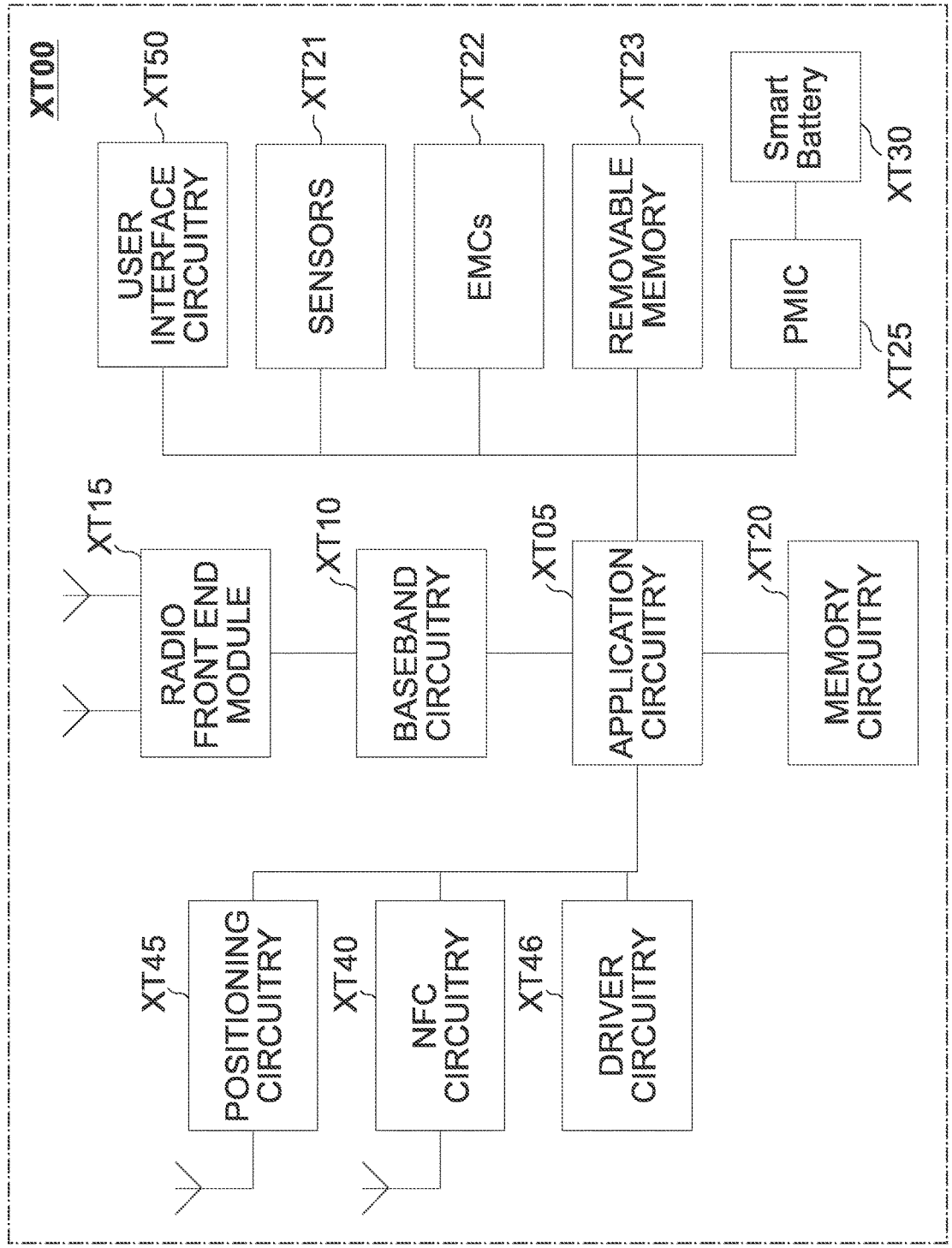
FIG. 10 shows an example of a platform used for network components.

FIG. 10 shows an example of a platform used for network components. FIG. 10 illustrates an example of a platform XT00 (or "device XT00") in accordance with various embodiments. In embodiments, the computer platform XT01 may be suitable for use as UEs XQ01, XQ02, XR01, application servers XQ30, and/or any other element/device discussed herein. The platform XT00 may include any combinations of the components shown in the example. The components of platform XT00 may be implemented as integrated circuits (ICs), portions thereof, discrete electronic devices, or other modules, logic, hardware, software, firmware, or a combination thereof adapted in the computer platform XT00, or as components otherwise incorporated within a chassis of a larger system. The block diagram of Fig. XT1 is intended to show a high level view of components of the computer platform XT00. However, some of the components shown may be omitted, additional components may be present, and different arrangement of the components shown may occur in other implementations.

The application circuitry XT05 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I$^2$C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform XT00. In some embodiments, processors of application circuitry XS05/XT05 may process IP data packets received from an EPC or 5GC.

Application circuitry XT05 be or include a microprocessor, a multi-core processor, a multithreaded processor, an ultra-low voltage processor, an embedded processor, or other known processing element. In one example, the application circuitry XT05 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry XT05 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry XT05 may be a part of a system on a chip (SoC) in which the application circuitry XT05 and other components are formed into a single integrated circuit, or a single package, such as the Edison™ or Galileo™ SoC boards from Intel® Corporation.

Additionally or alternatively, application circuitry XT05 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XT05 may comprise logic blocks or logic fabric including and other interconnected resources that may be programmed to perform various functions, such as the procedures, methods, functions, etc. of the various embodiments discussed herein. In such embodiments, the circuitry of application circuitry XT05 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry XT10 may be implemented, for example, as a solder-down substrate including one or more integrated circuits, a single packaged integrated circuit soldered to a main circuit board or a multi-chip module containing two or more integrated circuits. Although not shown, baseband circuitry XT10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XT10 may include protocol processing circuitry with one or more instances of control circuitry (not shown) to provide control functions for the digital baseband circuitry and/or radio frequency circuitry (for example, the radio front end modules XT15).

The radio front end modules (RFEMs) XS15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XS15. The RFEMs XS15 may incorporate both millimeter wave antennas and sub-millimeter wave antennas.

The memory circuitry XT20 may include any number and type of memory devices used to provide for a given amount of system memory. As examples, the memory circuitry XT20 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry XT20 may be developed in accordance with a Joint Electron Devices Engineering Council (JEDEC) low power double data rate (LPDDR)-based design, such as LPDDR2, LPDDR3, LPDDR4, or the like. Memory circuitry XS20 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the mass storage XQ08 may be on-die memory or registers associated with the application circuitry XT05. To provide for persistent storage of information such as data, applications, operating systems and so forth, memory circuitry XT20 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform XT00 may incorporate the three-dimensional (3D) cross-point (XPOINT) memories from Intel® and Micron®.

Removable memory circuitry XT23 may include devices, circuitry, enclosures/housings, ports or receptacles, etc. used to coupled portable data storage devices with the platform XT00. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform XT00 may also include interface circuitry (not shown) that is used to connect external devices with the platform XT00. The external devices may include sensors XT21, such as accelerometers, level sensors, flow sensors, temperature sensors, pressure sensors, barometric pressure sensors, and the like. The interface circuitry may be used to connect the platform XT00 to electro-mechanical components (EMCs) XT22, which may allow platform XT00 to change its state, position, and/or orientation, or move or control a mechanism or system. The EMCs XT22 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electromechanical components. In embodiments, platform XT00 may be configured to operate one or more EMCs XT22 based on one or more captured events and/or instructions or control signals received from a service provider and/or various clients.

In some implementations, the interface circuitry may connect the platform XT00 with positioning circuitry XT45, which may be the same or similar as the positioning circuitry XT45 discussed with regard to Fig. XS.

In some implementations, the interface circuitry may connect the platform XT00 with near-field communication (NFC) circuitry XT40, which may include an NFC controller coupled with an antenna element and a processing device. The NFC circuitry XT40 may be configured to read electronic tags and/or connect with another NFC-enabled device.

The driver circuitry XT46 may include software and hardware elements that operate to control particular devices that are embedded in the platform XT00, attached to the platform XT00, or otherwise communicatively coupled with the platform XT00. The driver circuitry XT46 may include individual drivers allowing other components of the platform XT00 to interact or control various input/output (I/O) devices that may be present within, or connected to, the platform XT00. For example, driver circuitry XT46 may include a display driver to control and allow access to a display device, a touchscreen driver to control and allow access to a touchscreen interface of the platform XT00, sensor drivers to obtain sensor readings of sensors XT21 and control and allow access to sensors XT21, EMC drivers to obtain actuator positions of the EMCs XT22 and/or control and allow access to the EMCs XT22, a camera driver to control and allow access to an embedded image capture device, audio drivers to control and allow access to one or more audio devices.

The power management integrated circuitry (PMIC) XT25 (also referred to as "power management circuitry XT25") may manage power provided to various components of the platform XT00. In particular, with respect to the baseband circuitry XT10, the PMIC XT25 may control power-source selection, voltage scaling, battery charging, or DC-to-DC conversion. The PMIC XT25 may often be included when the platform XT00 is capable of being powered by a battery XT30, for example, when the device is included in a UE XS01, XS02, XR01.

In some embodiments, the PMIC XT25 may control, or otherwise be part of, various power saving mechanisms of the platform XT00. For example, if the platform XT00 is in an RRC_Connected state, where it is still connected to the RAN node as it expects to receive traffic shortly, then it may enter a state known as Discontinuous Reception Mode (DRX) after a period of inactivity. During this state, the platform XT00 may power down for brief intervals of time and thus save power. If there is no data traffic activity for an extended period of time, then the platform XT00 may transition off to an RRC_Idle state, where it disconnects from the network and does not perform operations such as channel quality feedback, handover, etc. The platform XT00 goes into a very low power state and it performs paging where again it periodically wakes up to listen to the network and then powers down again. The platform XT00 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery XT30 may power the platform XT00, although in some examples the platform XT00 may be mounted deployed in a fixed location, and may have a power supply coupled to an electrical grid. The battery XT30 may be a lithium ion battery, a metal-air battery, such as a zinc-air battery, an aluminum-air battery, a lithium-air battery, and the like. In some implementations, such as in V2X applications, the battery XT30 may be a typical lead-acid automotive battery.

In some implementations, the battery XT30 may be a "smart battery," which includes or is coupled with a Battery Management System (BMS) or battery monitoring integrated circuitry. The BMS may be included in the platform XT00 to track the state of charge (SoCh) of the battery XT30. The BMS may be used to monitor other parameters of the battery XT30 to provide failure predictions, such as the state of health (SoH) and the state of function (SoF) of the battery XT30. The BMS may communicate the information of the battery XT30 to the application circuitry XT05 or other components of the platform XT00. The BMS may also include an analog-to-digital (ADC) convertor that allows the application circuitry XT05 to directly monitor the voltage of the battery XT30 or the current flow from the battery XT30. The battery parameters may be used to determine actions that the platform XT00 may perform, such as transmission frequency, network operation, sensing frequency, and the like.

A power block, or other power supply coupled to an electrical grid may be coupled with the BMS to charge the battery XT30. In some examples, the power block XQ28 may be replaced with a wireless power receiver to obtain the power wirelessly, for example, through a loop antenna in the computer platform XT00. In these examples, a wireless battery charging circuit may be included in the BMS. The specific charging circuits chosen may depend on the size of the battery XT30, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform XT00 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a TimeTrigger Protocol (TTP) system, or a FlexRay system, or any number of other technologies.

The bus may be a proprietary bus, for example, used in a SoC based system. Other bus systems may be included, such as an $I^2C$ interface, an SPI interface, point to point interfaces, and a power bus, among others.

Figure 11:
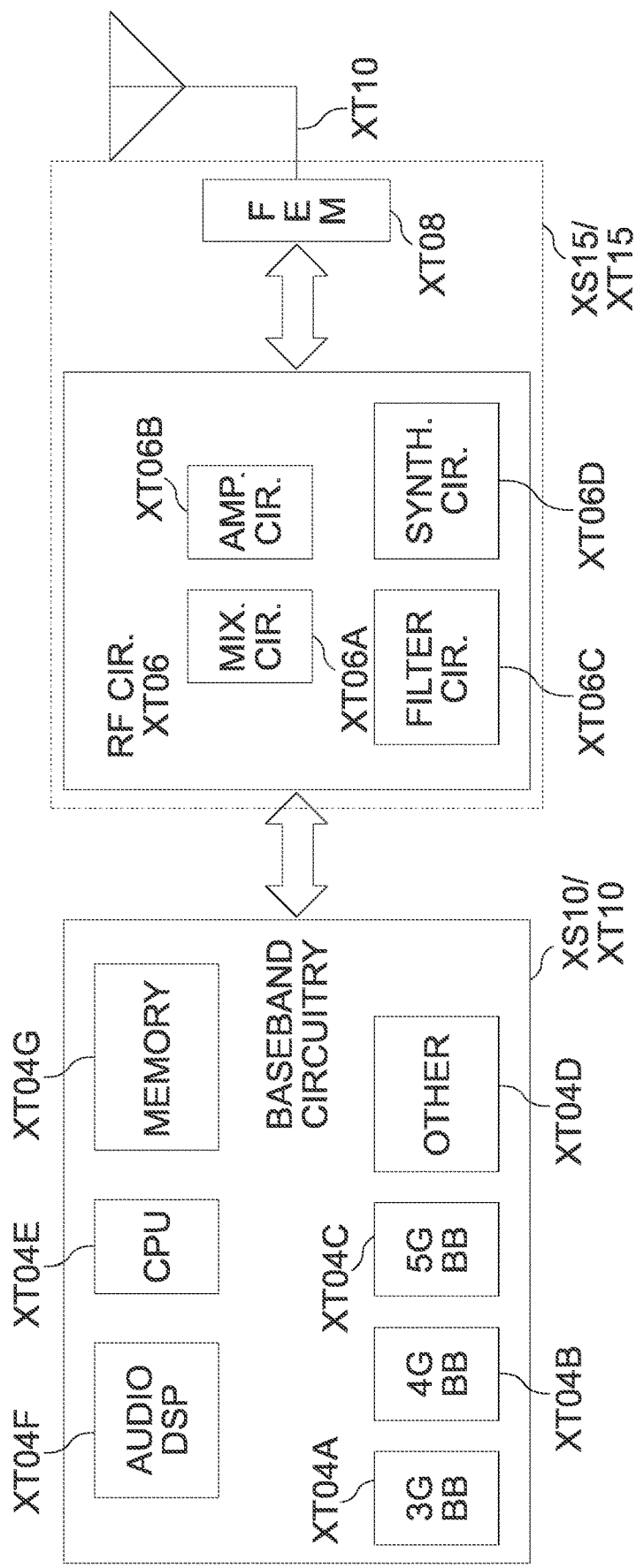
FIG. 11 shows an example of base band circuitry.

FIG. 11 shows an example of base band circuitry. FIG. 11 illustrates example components of baseband circuitry XS10/XT10, 30, 40 and radio front end modules (RFEM) XS15/XT15 in accordance with some embodiments. As shown, the RFEM XS15/XT15 may include Radio Frequency (RF) circuitry XT06, front-end module (FEM) circuitry XT08, one or more antennas XT10 coupled together at least as shown.

The baseband circuitry XS10/XT10 may include circuitry such as, but not limited to, one or more single-core or multi-core processors. The baseband circuitry XS10/XT10 may include one or more baseband processors or control logic to process baseband signals received from a receive signal path of the RF circuitry XT06 and to generate baseband signals for a transmit signal path of the RF circuitry XT06. Baseband processing circuity XS10/XT10 may interface with the application circuitry XS05/XT05 for generation and processing of the baseband signals and for controlling operations of the RF circuitry XT06. For example, in some embodiments, the baseband circuitry XS10/XT10 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XS10/XT10 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XS10/XT10 may include Fast-Fourier Transform (FFT), precoding, or constellation mapping/demapping functionality. In some embodiments, encoding/decoding circuitry of the baseband circuitry XS10/XT10 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XS10/XT10 may include one or more audio digital signal processor(s) (DSP) XT04F. The audio DSP(s) XT04F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry XS10/XT10 and the application circuitry XS05/XT05 may be implemented together such as, for example, on a system on a chip (SOC).

In some embodiments, the baseband circuitry XS10/XT10 may provide for communication compatible with one or more radio technologies. For example, in some embodiments, the baseband circuitry XS10/XT10 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry XS10/XT10 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XS10/XT10. RF circuitry XT06 may also include a transmit signal path which may include circuitry to up-convert baseband signals provided by the baseband circuitry XS10/XT10 and provide RF output signals to the FEM circuitry XT08 for transmission.

In some embodiments, the receive signal path of the RF circuitry XT06 may include mixer circuitry XT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT06b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XS10/XT10 for further processing. In some embodiments, the output baseband signals may be zero-frequency baseband signals, although this is not a requirement. In some embodiments, mixer circuitry XT06a of the receive signal path may comprise passive mixers, although the scope of the embodiments is not limited in this respect.

In some embodiments, the mixer circuitry XT06a of the transmit signal path may be configured to up-convert input baseband signals based on the synthesized frequency provided by the synthesizer circuitry XT06d to generate RF output signals for the FEM circuitry XT08. The baseband signals may be provided by the baseband circuitry XS10/XT10 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XS10/XT10 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XS10/XT10 or the applications processor XS05/XT05 depending on the desired output frequency. In some embodiments, a divider control input (e.g., N) may be determined from a look-up table based on a channel indicated by the applications processor XS05/XT05.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

Processors of the application circuitry XS05/XT05 and processors of the baseband circuitry XS10/XT10 may be used to execute elements of one or more instances of a protocol stack. For example, processors of the baseband circuitry XS10/XT10, alone or in combination, may be used execute Layer 3, Layer 2, or Layer 1 functionality, while processors of the baseband circuitry XS10/XT10 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
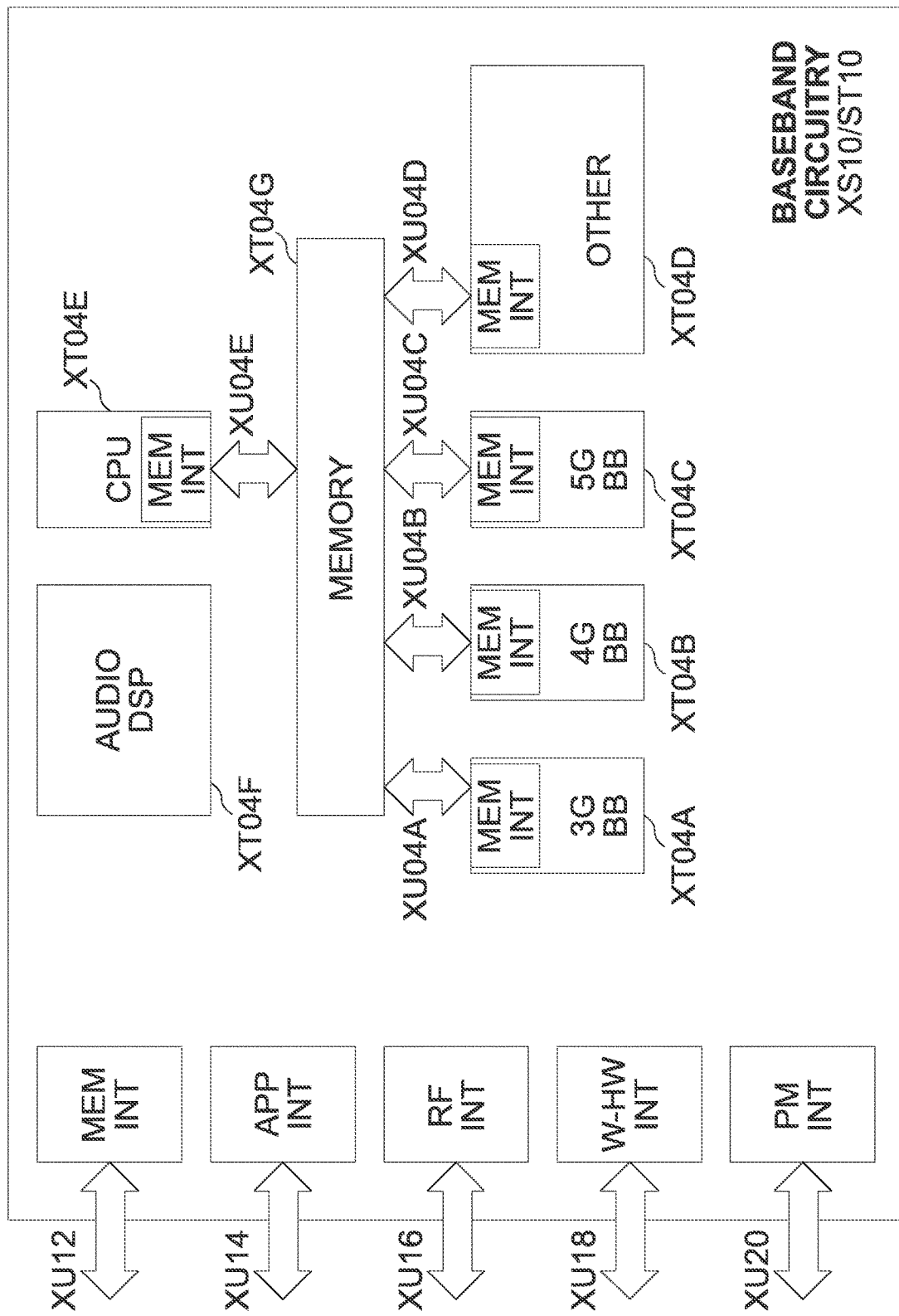
FIG. 12 shows examples of interfaces of base band circuitry.

FIG. 12 shows examples of interfaces 32, 42 of base band circuitry 30, 40. FIG. 12 illustrates example interfaces of baseband circuitry 30, 40 in accordance with some embodiments. As discussed above, the baseband circuitry XS10/XT10 of Fig. XT may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XS10/XT10 may further include one or more interfaces to communicatively couple to other circuitries/devices, such as a memory interface XU12 (e.g., an interface to send/receive data to/from memory external to the baseband circuitry XS10/XT10), an application circuitry interface XU14 (e.g., an interface to send/receive data to/from the application circuitry XS05/XT05 of Fig. XT), an RF circuitry interface XU16 (e.g., an interface to send/receive data to/from RF circuitry XT06 of Fig. XT), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMIC XT25.

Figure 13:
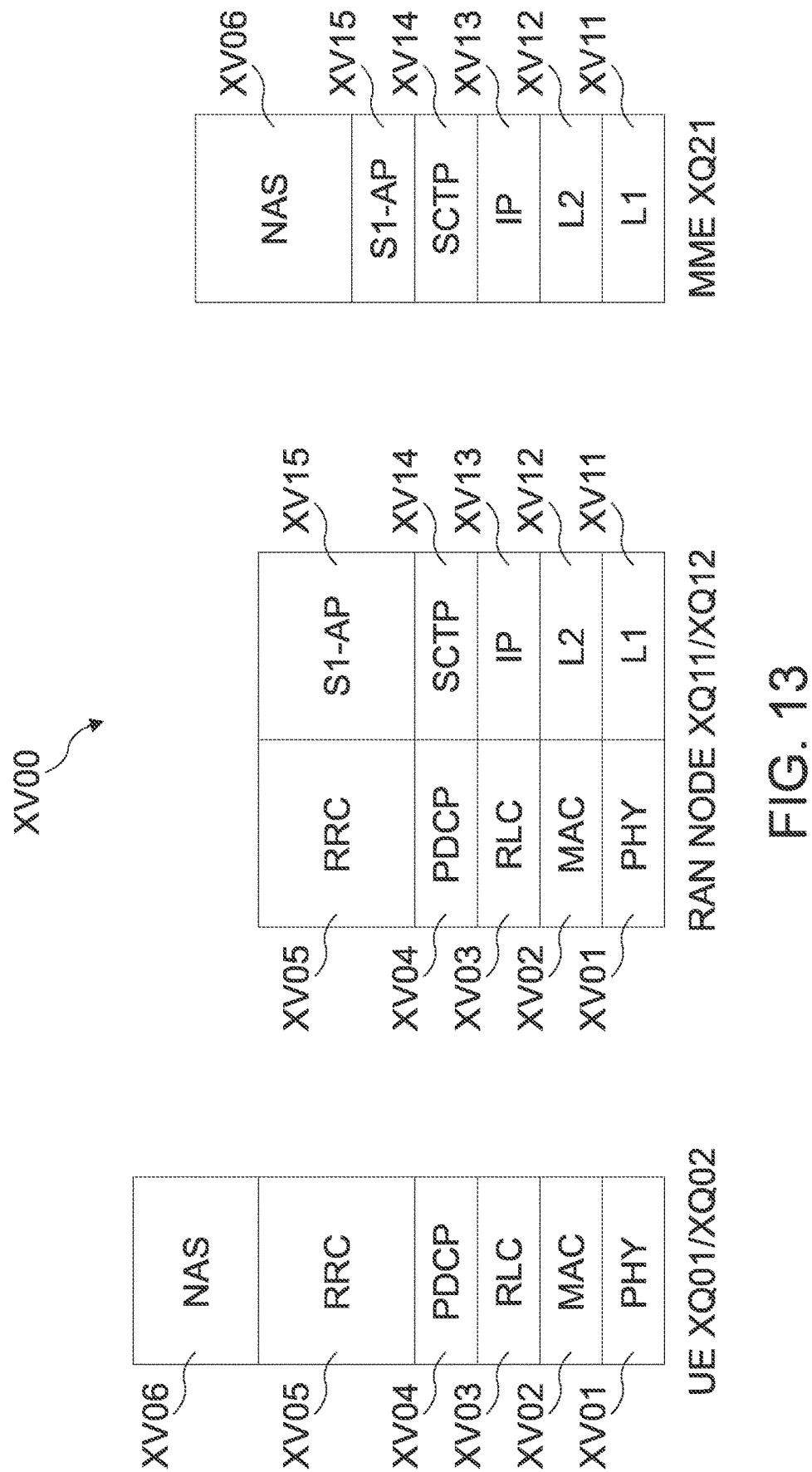
FIG. 13 shows a control plane protocol stack in an example.

FIG. 13 shows a control plane protocol stack in an example. FIG. 13 is an illustration of a control plane protocol stack in accordance with some embodiments. In this embodiment, a control plane XV00 is shown as a communications protocol stack between the UE XQ01 (or alternatively, the UE XQ02), the RAN node XQ11 (or alternatively, the RAN node XQ12), and the MME XQ21.

The PHY layer XV01 may transmit or receive information used by the MAC layer XV02 over one or more air interfaces. The PHY layer XV01 may further perform link adaptation or adaptive modulation and coding (AMC), power control, cell search (e.g., for initial synchronization and handover purposes), and other measurements used by higher layers, such as the RRC layer XV05. The PHY layer XV01 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer XV02 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer XV03 may operate in a plurality of modes of operation, including: Transparent Mode (TM), Unacknowledged Mode (UM), and Acknowledged Mode (AM). The RLC layer XV03 may execute transfer of upper layer protocol data units (PDUs), error correction through automatic repeat request (ARQ) for AM data transfers, and concatenation, segmentation and reassembly of RLC SDUs for UM and AM data transfers. The RLC layer XV03 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer XV04 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer XV05 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE XQ01 and the RAN node XQ11 may utilize a Uu interface (e.g., an LTE-Uu interface) to exchange control plane data via a protocol stack comprising the PHY layer XV01, the MAC layer XV02, the RLC layer XV03, the PDCP layer XV04, and the RRC layer XV05.

The non-access stratum (NAS) protocols XV06 form the highest stratum of the control plane between the UE XQ01 and the MME XQ21. The NAS protocols XV06 support the mobility of the UE XQ01 and the session management procedures to establish and maintain IP connectivity between the UE XQ01 and the P-GW XQ23.

The S1 Application Protocol (S1-AP) layer XV15 may support the functions of the S1 interface and comprise Elementary Procedures (EPs). An EP is a unit of interaction between the RAN node XQ11 and the CN XQ20. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) XV14 may ensure reliable delivery of signaling messages between the RAN node XQ11 and the MME XQ21 based, in part, on the IP protocol, supported by the IP layer XV13. The L2 layer XV12 and the L1 layer XV11 may refer to communication links (e.g., wired or wireless) used by the RAN node and the MME to exchange information.

The RAN node XQ11 and the MME XQ21 may utilize an S1-MME interface to exchange control plane data via a protocol stack comprising the L1 layer XV11, the L2 layer XV12, the IP layer XV13, the SCTP layer XV14, and the S1-AP layer XV15.

Figure 14:
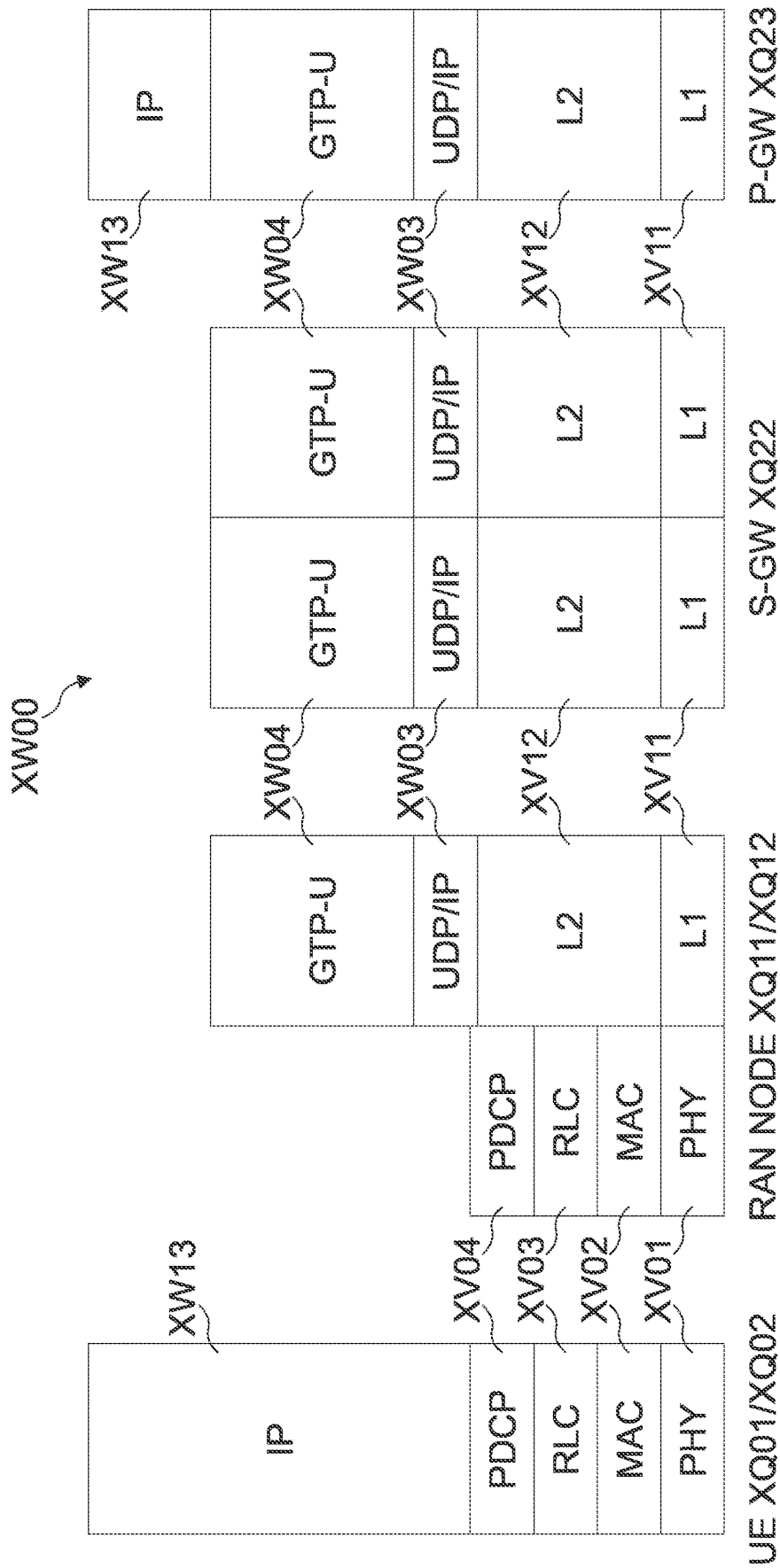
FIG. 14 shows a user plane protocol stack in an example.

FIG. 14 shows a user plane protocol stack in an example. FIG. 14 is an illustration of a user plane protocol stack in accordance with some embodiments. In this embodiment, a user plane XW00 is shown as a communications protocol stack between the UE XQ01 (or alternatively, the UE XQ02), the RAN node XQ11 (or alternatively, the RAN node XQ12), the S-GW XQ22, and the P-GW XQ23. The user plane XW00 may utilize at least some of the same protocol layers as the control plane XV00. For example, the UE XQ01 and the RAN node XQ11 may utilize a Uu interface (e.g., an LTE-Uu interface) to exchange user plane data via a protocol stack comprising the PHY layer XV01, the MAC layer XV02, the RLC layer XV03, the PDCP layer XV04.

The General Packet Radio Service (GPRS) Tunneling Protocol for the user plane (GTP-U) layer XW04 may be used for carrying user data within the GPRS core network and between the radio access network and the core network. The user data transported can be packets in any of IPv4, IPv6, or PPP formats, for example. The UDP and IP security (UDP/IP) layer XW03 may provide checksums for data integrity, port numbers for addressing different functions at the source and destination, and encryption and authentication on the selected data flows. The RAN node XQ11 and the S-GW XQ22 may utilize an S1-U interface to exchange user plane data via a protocol stack comprising the L1 layer XVII, the L2 layer XV12, the UDP/IP layer XW03, and the GTP-U layer XW04. The S-GW XQ22 and the P-GW XQ23 may utilize an S5/S8a interface to exchange user plane data via a protocol stack comprising the L1 layer XV11, the L2 layer XV12, the UDP/IP layer W03, and the GTP-U layer W04. As discussed above with respect to Fig. XV, NAS protocols support the mobility of the UE XQ01 and the session management procedures to establish and maintain IP connectivity between the UE XQ01 and the P-GW XQ23.

Figure 15:
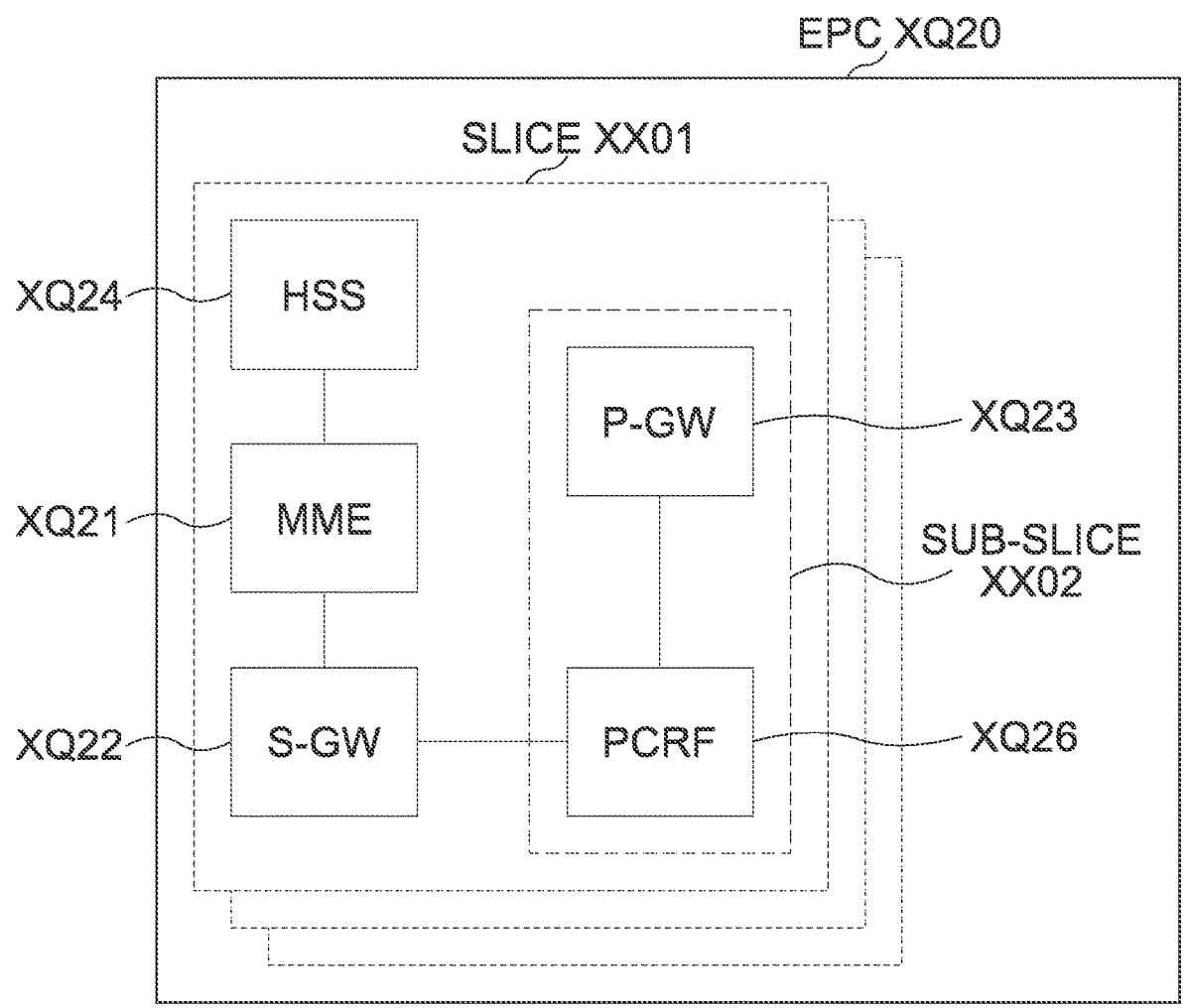
FIG. 15 illustrates core network components in an example.

FIG. 15 illustrates core network components in an example. FIG. 15 illustrates components of a core network in accordance with some embodiments. The components of the CN XQ20 may be implemented in one physical node or separate physical nodes including components to read and execute instructions from a machine-readable or computer-readable medium (e.g., a non-transitory machine-readable storage medium). In embodiments, the components of CN XR20 may be implemented in a same or similar manner as discussed herein with regard to the components of CN XQ20. In some embodiments, Network Functions Virtualization (NFV) is utilized to virtualize any or all of the above described network node functions via executable instructions stored in one or more computer readable storage mediums (described in further detail below). A logical instantiation of the CN XQ20 may be referred to as a network slice XX01. A logical instantiation of a portion of the CN XQ20 may be referred to as a network sub-slice XX02 (e.g., the network sub-slice XX02 is shown to include the P-GW XQ23 and the PCRF XQ26).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 16:
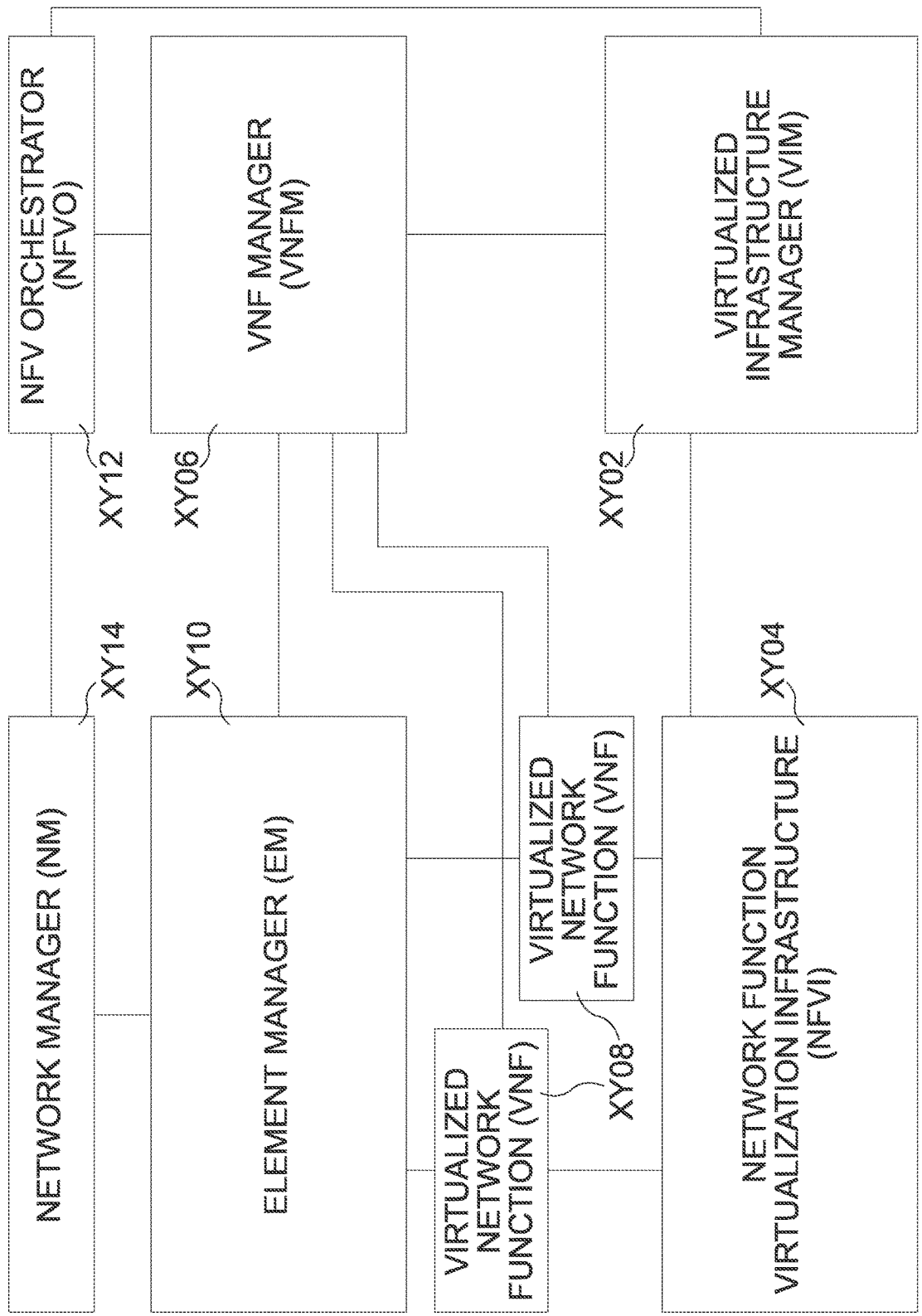
FIG. 16 illustrates an example of a system supporting network virtualization.

FIG. 16 illustrates an example of a system supporting network virtualization. FIG. 16 is a block diagram illustrating components, according to some example embodiments, of a system XY00 to support NFV. The system XY00 is illustrated as including a virtualized infrastructure manager (VIM) XY02, a network function virtualization infrastructure (NFVI) XY04, a VNF manager (VNFM) XY06, virtualized network functions (VNFs) XY08, an element manager (EM) XY10, an NFV Orchestrator (NFVO) XY12, and a network manager (NM) XY14.

The VIM XY02 manages the resources of the NFVI XY04. The NFVI XY04 can include physical or virtual resources and applications (including hypervisors) used to execute the system XY00. The VIM XY02 may manage the life cycle of virtual resources with the NFVI XY04 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM XY06 may manage the VNFs XY08. The VNFs XY08 may be used to execute EPC components/functions. The VNFM XY06 may manage the life cycle of the VNFs XY08 and track performance, fault and security of the virtual aspects of VNFs XY08. The EM XY10 may track the performance, fault and security of the functional aspects of VNFs XY08. The tracking data from the VNFM XY06 and the EM XY10 may comprise, for example, performance measurement (PM) data used by the VIM XY02 or the NFVI XY04. Both the VNFM XY06 and the EM XY10 can scale up/down the quantity of VNFs of the system XY00.

The NFVO XY12 may coordinate, authorize, release and engage resources of the NFVI XY04 in order to provide the requested service (e.g., to execute an EPC function, component, or slice). The NM XY14 may provide a package of end-user functions with the responsibility for the management of a network, which may include network elements with VNFs, non-virtualized network functions, or both (management of the VNFs may occur via the EM XY10).

FIG. 17 illustrates components capable to read machine-readable instructions in an example. FIG. 17 is a block diagram illustrating components, according to some example embodiments, able to read instructions from a machine-readable or computer-readable medium (e.g., a non-transitory machine-readable storage medium) and perform any one or more of the methodologies discussed herein. Specifically, Fig. XZ shows a diagrammatic representation of hardware resources XZ00 including one or more processors (or processor cores) XZ10, one or more memory/storage devices XZ20, and one or more communication resources XZ30, each of which may be communicatively coupled via a bus XZ40. For embodiments where node virtualization (e.g., NFV) is utilized, a hypervisor XZ02 may be executed to provide an execution environment for one or more network slices/sub-slices to utilize the hardware resources XZ00

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

In some embodiments, the electronic device(s), network(s), system(s), chip(s) or component(s), or portions or implementations thereof, of any figure herein may be configured to perform one or more processes, techniques, or methods as described herein, or portions thereof. In some embodiments, the electronic device(s), network(s), system(s), chip(s) or component(s), or portions or implementations thereof, of any figure herein may be configured to operate according to one or more of the following examples.

Example 1 is a method for user equipment, which is configured to communicate in a mobile communication system, the method comprising receiving, using radio resources on a first antenna beam, an instruction to receive control data on radio resources on a second antenna beam; acknowledging reception of the instruction; and monitoring the radio resources on the first antenna beam for a repetition of the instruction after receiving the instruction.

Example 2 is the method of example 1, wherein the monitoring is time limited for a predefined time.

Example 3 is the method of example 2, further comprising starting a beam switching timer after the instruction is received using the radio resources on the first antenna beam and enabling reception using the radio resources on the second antenna beam after the beam switching timer expires.

Example 4 is the method of example 3, wherein the beam switching timer is re-started if a repetition of the instruction is received during the predefined time.

Example 5 is the method of any of the examples 1 to 4, further comprising enabling reception using the radio resources on the second antenna beam after reception of the instruction.

Example 6 is the example 5, further comprising enabling reception using the radio resources on the first antenna beam and using the radio resources on the second antenna beam after reception of the instruction.

Example 7 is the method of any of the examples 1 to 6, wherein the radio resources on the first antenna beam are configured as default control signaling resource.

Example 8 is the method of any of the examples 1 to 7, wherein the instruction is received on a Physical Downlink Control CHannel, PDCCH.

Example 9 is the method of any of the examples 1 to 8, wherein the instruction is part of a Media Access Control-Control Element, MAC-CE, and comprises information on a Transmission Configuration Indication, TCI.

Example 10 is the method of example 9, wherein the instruction indicates a TCI state of a Control Resource Set, CORESET.

Example 11 is a method for a base station, which is configured to communicate in a mobile communication system, the method comprising transmitting, using radio resources on a first antenna beam, an instruction to receive control data using radio resources on a second antenna beam to user equipment; monitoring the radio resources on the first antenna beam for receiving an acknowledgment on a reception of the instruction by the user equipment; repeating transmitting the instruction using the radio resources on the first antenna beam in case the acknowledgement is not received; and transmitting control data using the radio resources on the second antenna beam after the acknowledgment is received.

Example 12 is the method of example 11, wherein the transmitting of the control data using the radio resources on the second antenna beam is carried out at a predefined time after repeating transmitting the instruction or after receiving the acknowledgement.

Example 13 is the method of example 12, further comprising starting a beam switching timer after the instruction is transmitted using the radio resources on the first antenna beam or after receiving the acknowledgment, and starting transmitting the control data using the radio resources on the second antenna beam after the timer expires.

Example 14 is the method of example 13, wherein the beam switching timer is re-started after repeating transmitting the instruction.

Example 15 is the method of any of the examples 11 to 14, further comprising transmitting using the radio resources on the first antenna beam and using the radio resources on the second antenna beam after reception of the acknowledgement.

Example 16 is the method of any of the examples 11 to 15, further comprising configuring the radio resources on the first antenna beam as default control signaling resource.

Example 17 is the method of any of the examples 11 to 16, wherein the instruction is transmitted on a Physical Downlink Control CHannel, PDCCH.

Example 18 is the method of any of the examples 11 to 17, wherein the instruction is part of a Media Access Control-Control Element, MAC-CE, and comprises information on a Transmission Configuration Indication, TCI.

Example 19 is the method of example 18, wherein the instruction indicates a TCI state of a Control Resource Set, CORESET.

Example 20 is baseband circuitry for user equipment, UE, configured to communicate in a mobile communication system, comprising one or more interfaces configured to communicate within the mobile communication system, and a processor configured to carry out the method of any of the examples 1 to 10.

Example 21 is baseband circuitry for a base station configured to communicate in a mobile communication system, comprising one or more interfaces configured to communicate within the mobile communication system, and a processor configured to carry out the method of any of the examples 11 to 19.

Example 22 is user equipment comprising the baseband circuitry of example 20.

Example 23 is a base station comprising the baseband circuitry of example 21.

Example 24 is a mobile communication system comprising at least one user equipment according to example 22 and at least one base station according to example 23.

Example 25 is a machine readable medium including code, when executed, to cause a machine to perform a method for user equipment, which is configured to communicate in a mobile communication system, the method comprising receiving, using radio resources on a first antenna beam, an instruction to receive control data on radio resources on a second antenna beam; acknowledging reception of the instruction; and monitoring the radio resources on the first antenna beam for a repetition of the instruction after receiving the instruction.

Example 26 is a machine readable medium including code, when executed, to cause a machine to perform a method for a base station, which is configured to communicate in a mobile communication system, the method comprising transmitting, using radio resources on a first antenna beam, an instruction to receive control data using radio resources on a second antenna beam to user equipment; monitoring the radio resources on the first antenna beam for receiving an acknowledgment on a reception of the instruction by the user equipment; repeating transmitting the instruction using the radio resources on the first antenna beam in case the acknowledgement is not received; and transmitting control data using the radio resources on the second antenna beam after the acknowledgment is received.

Example 27 may include the timer based TCI update uses a timer when UE receives beam switching MAC-CE from gNB, and UE switches to the new TCI state for the CORESET when the timer expires.

Example 28 may include the timer in example 27 or some other example herein used for updating CORESET TCI state to realize beam switching, e.g., called "Timer-CoresetTci-Update", can be configured to the UE by RRC signaling when multiple TCI states are associated with a configured CORESET.

Example 29 may include this timer in example 27 or some other example herein can be configured in either UE-specific or CORESET-specific manner. In case of CORESET-specific configuration, different CORESETs with multiple TCI states may be configured with different value for the Timer-CoresetTciUpdate.

Example 30 may include at a time t0, gNB sends a PDCCH transmitted with old beam TCI#1 to schedule a MAC-CE updating the CORESET TCI state to the UE.

Example 31 may include at a later time t1, UE correctly receives and decodes the PDCCH and scheduled MAC-CE updating TCI state.

Example 32 may include at a later time t2, UE sends ACK response regarding the received MAC-CE to gNB, and starts the timer "Timer-CoresetTciUpdate". Before the timer expires, UE continues to use old beam TCI#1 associated DL receive beam for the PDCCH reception from the CORESET.

Example 33 may include the value of the timer in example 32 or some other example herein, wherein should be set to a proper value to provide a sufficient time window to enable several, e.g., 3, retransmissions of MAC-CE signaling in case of poor data link transmission reliability.

Example 34 may include at a later time t3 when gNB expects ACK/NACK response from the UE for the reception of previously transmitted MAC-CE signaling TCI state update, if gNB receives nothing or NACK response from UE for the reception of MAC-CE, gNB continues to use old beam TCI#1 for all PDCCHs in the CORESET.

Example 35 may include at a later time t4, gNB sends the PDCCH using old beam TCI#1 to schedule a retransmission of beam switching MAC-CE.

Example 36 may include at a later time t5, UE correctly receives the retransmitted MAC-CE updating the TCI state, and stops the timer "Timer-CoresetTciUpdate".

Example 37 may include at a later time t6, UE sends the ACK response about the correctly received MAC-CE to gNB, and restarts the timer "Timer-CoresetTciUpdate".

Example 38 may include at a later time t7, gNB correctly receives the ACK feedback from UE, and starts to use new beam TCI#2 for the future PDCCH transmission from the CORESET.

Example 39 may include upon receiving the ACK from UE, gNB shall start PDCCH transmission with new beam TCI#2 after UE's timer in example 11 expires.

Example 40 may include at a later time t8, when the timer expires, UE switches its DL receive beam corresponding to the new transmit beam TCI#2 for the PDCCH reception.

Example 41 may include when several CORESETs are configured to a UE, cross-CORESET TCI update MAC-CE signaling can be used wherein the MAC CE scheduled from the CORESET x can signal the TCI state update of CORESET y.

Example 42 may include the MAC CE in example 15 or some other example herein signaling the updated TCI state for other CORESET shall also indicate the ID of CORESET whose TCI state is updated. The information field format of MAC CE for TCI state update can be given as follows:
TCI state update field of MAC CE:={CORESET ID; New TCI state}

Example 43 may include the cross-CORESET TCI update method in example 15 or some other example herein, can be when multiple CORESETs are configured to a UE.

Example 44 may include if one of configured CORESETs in example 43 or some other example herein, e.g., the one with the lowest CORESET ID, is configured with only one TCI state, it can be considered as the default CORESET, and can be used to update the TCI state of other CORESETs with multiple configured TCI states.

Example 45 may include in cross-CORESET TCI update method in example 41 or some other example herein, wherein at a time t0, MAC-CE scheduled in CORESET x signals the TCI update from TCI#1 to TCI#2 for CORESET y.

Example 46 may include at a later time t2, UE sends ACK response to gNB about the correct reception of MAC-CE. From time t2 onwards, UE applies the receive beam for CORESET y corresponding to new beam TCI#2.

Example 47 may include if ACK is lost or NACK is received at a later time t3 at gNB, and at a time t4 gNB sends the retransmitted MAC-CE scheduled in CORESET x to UE.

Example 48 may include at a later time t7, upon the reception of ACK from UE, gNB switches the DL beam of CORESET y from TCI#1 to TCI#2.

Example 49 may include an apparatus comprising beam management means for identifying a new transmission configuration indicator (TCI) state in response to receipt of media access control (MAC) control element (CE) for beam switching, and the beam management means for switching to the new TCI state for a control channel resource set (CORESET).

Example 50 may include the apparatus of example 49 or some other example herein, further comprising timing means for: implementing a timer in response to receipt of the MAC CE, wherein the beam management means is for switching to the new TCI state for CORESET when the timer expires, and updating a CORESET TCI state to realize beam switching based on a "Timer-CoresetTciUpdate" configured via radio resource control (RRC) signaling when multiple TCI states are associated with the configured CORESET.

Example 51 may include the apparatus of example 50 or some other example herein, wherein the Timer-CoresetTciUpdate is UE-specific or CORESET-specific, wherein the CORESET-specific Timer-CoresetTciUpdate configuration comprises different CORESETs corresponding to multiple TCI states and having different values for the Timer-CoresetTciUpdate.

Example 52 may include the apparatus of example 50 or some other example herein, further comprising communication means for receiving a physical downlink control channel (PDCCH) transmission that is to be transmitted with an old beam TCI#1 to schedule the MAC CE for updating the CORESET TCI state.

Example 53 may include the apparatus of example 52 or some other example herein, further comprising decoding/encoding means for decoding the received PDCCH transmission and the scheduled MAC CE for updating the TCI state.

Example 54 may include the apparatus of example 53 or some other example herein, wherein the communication means is for transmitting acknowledgement (ACK) feedback regarding the received MAC CE, and the timing means is for starting the timer "Timer-CoresetTciUpdate" simultaneously of after transmission of the ACK feedback, wherein the beam management means is for continuing to use the old beam TCI#1 associated DL receive beam for the PDCCH reception from the CORESET before the timer expires.

Example 55 may include the apparatus of examples 53-54 or some other example herein, wherein the timing means is for setting the timer with a value to provide a sufficient time window to allow for a plurality of retransmissions of MAC CE signaling in case of poor data link transmission reliability.

Example 56 may include the apparatus of examples 53-55 or some other example herein, wherein a next generation NodeB (gNB) is to continue to use old beam TCI#1 for all PDCCHs in the CORESET when the communication means sends a negative ACK (NACK) feedback or sends nothing for the reception of the MAC-CE signaling for the TCI state update.

Example 57 may include the apparatus of example 56 or some other example herein, wherein the communication means is for receiving the PDCCH transmission using the old beam TCI#1 to schedule a retransmission of beam switching MAC CE.

Example 58 may include the apparatus of example 57 or some other example herein, wherein the timing means is for stopping the timer "Timer-CoresetTciUpdate" in response to receipt of a retransmitted MAC CE updating the TCI state.

Example 59 may include the apparatus of example 58 or some other example herein, wherein the communication means is for transmitting an ACK feedback about the correctly received MAC CE, and the timing means is for restarting the timer "Timer-CoresetTciUpdate".

Example 60 may include the apparatus of example 59 or some other example herein, wherein the gNB is to start to use a new beam TCI#2 for future PDCCH transmissions from the CORESET in response to the ACK feedback.

Example 61 may include the apparatus of example 60 or some other example herein, wherein the gNB is to initiate a PDCCH transmission using the new beam TCI#2 after the timer has expired.

Example 62 may include the apparatus of example 61 or some other example herein, wherein the beam management means is for, when the timer expires, switching a downlink (DL) receive beam corresponding to the new transmit beam TCI#2 for the PDCCH reception.

Example 63 may include the apparatus of example 59 or some other example herein, wherein the MAC CE is a cross-CORESET TCI update MAC-CE, wherein the MAC CE scheduled from a first CORESET is to signal a TCI state update of a second CORESET different than the first CORESET.

Example 64 may include the apparatus of example 63 or some other example herein, wherein the MAC CE signaling the updated TCI state for other CORESET is to also indicate an identifier (ID) of a CORESET whose TCI state is updated, wherein an information field format of the MAC CE to indicate the updated TCI state comprises: TCI state update field of MAC CE:={CORESET ID; New TCI state}.

Example 65 may include the apparatus of examples 63-64 or some other example herein, further comprising: communication means for receiving an RRC message, the RRC message to include a configuration, wherein the configuration is to indicate a plurality of CORESETS to be used at least for beam reception.

Example 66 may include the apparatus of example 65 or some other example herein, wherein a CORESET of the plurality of CORESETs having a lowest CORESET identifier (ID) and configured with only one TCI state is to be considered as a default CORESET, wherein the beam management means is for updating, using the default CORESET, TCI states of other CORESETs of the plurality of CORESETs having multiple configured TCI states.

Example 67 may include the apparatus of examples 64-66 or some other example herein, wherein the MAC-CE scheduled in the first CORESET is to signal a TCI update from TCI#1 to TCI#2 for the second CORESET.

Example 68 may include the apparatus of examples 65-67 or some other example herein, wherein the communication means is for sending ACK feedback to a gNB to indicate that the MAC-CE has been properly received and decoded, and wherein the beam management means is for applying the receive beam for the second CORESET corresponding to new beam TCI#2.

Example 69 may include the apparatus of example 68 or some other example herein, wherein the communication means is for receiving a retransmitted MAC-CE scheduled in first CORESET when the gNB does not obtain the ACK or when the communication means sends a NACK.

Example 70 may include the apparatus of example 69 or some other example herein, wherein the gNB is to switch a DL beam of the second CORESET from TCI#1 to TCI#2 upon reception of the ACK feedback.

Example 71 may include the apparatus of examples 59-70 or some other example herein, wherein the apparatus is to be implemented in or by a user equipment (UE).

Example 72 may include an apparatus comprising means to perform one or more elements of a method described in or related to any of examples 27-71, or any other method or process described herein.

Example 73 may include one or more non-transitory computer-readable media comprising instructions to cause an electronic device, upon execution of the instructions by one or more processors of the electronic device, to perform one or more elements of a method described in or related to any of examples 27-71, or any other method or process described herein.

Example 74 may include an apparatus comprising logic, modules, or circuitry to perform one or more elements of a method described in or related to any of examples 27-71, or any other method or process described herein.

Example 75 may include a method, technique, or process as described in or related to any of examples 27-71, or portions or parts thereof.

Example 76 may include an apparatus comprising: one or more processors and one or more computer readable media comprising instructions that, when executed by the one or more processors, cause the one or more processors to perform the method, techniques, or process as described in or related to any of examples 27-71, or portions thereof.

Example 77 may include a signal as described in or related to any of examples 27-71, or portions or parts thereof.

Example 78 may include a signal in a wireless network as shown and described herein.

Example 79 may include a method of communicating in a wireless network as shown and described herein.

Example 80 may include a system for providing wireless communication as shown and described herein.

Example 81 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", may be implemented in the form of dedicated hardware, such as "a signal provider", "a signal processing unit", "a processor", "a controller", as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. Baseband circuitry for user equipment, UE, configured to communicate in a mobile communication system, comprising
one or more interfaces configured to communicate within the mobile communication system, and
a processor configured to
receive, using radio resources on a first antenna beam, an instruction to receive control data on radio resources on a second antenna beam;
acknowledge reception of the instruction; and
monitor the radio resources on the first antenna beam for a repetition of the instruction after receiving the instruction.

2. The baseband circuitry of claim 1, wherein the processor is configured to carry out the monitoring as time limited for a predefined time.

3. The baseband circuitry of claim 2, wherein the processor is configured to start a beam switching timer after the instruction is received using the radio resources on the first antenna beam and to enable reception using the radio resources on the second antenna beam after the beam switching timer expires.

4. The baseband circuitry of claim 3, wherein the beam switching timer is re-started if a repetition of the instruction is received during the predefined time.

5. The baseband circuitry of claim 1, wherein the processor is configured to enable reception using the radio resources on the second antenna beam after reception of the instruction.

6. The baseband circuitry of claim 5, wherein the processor is configured to enable reception using the radio resources on the first antenna beam and using the radio resources on the second antenna beam after reception of the instruction.

7. The baseband circuitry of claim 1, wherein the radio resources on the first antenna beam are configured as default control signaling resource.

8. The baseband circuitry of claim 1, wherein the instruction is received on a Physical Downlink Control CHannel, PDCCH.

9. The baseband circuitry of claim 1, wherein the instruction is part of a Media Access Control-Control Element, MAC-CE, and comprises information on a Transmission Configuration Indication, TCI.

10. The baseband circuitry of claim 9, wherein the instruction indicates a TCI state of a Control Resource Set, CORESET.

11. Baseband circuitry for a base station configured to communicate in a mobile communication system, comprising
one or more interfaces configured to communicate within the mobile communication system, and
a processor configured to
transmit, using radio resources on a first antenna beam, an instruction to receive control data using radio resources on a second antenna beam to user equipment;
monitor the radio resources on the first antenna beam for receiving an acknowledgment on a reception of the instruction by the user equipment;
repeating transmitting the instruction using the radio resources on the first antenna beam in case the acknowledgement is not received; and
transmit control data using the radio resources on the second antenna beam after the acknowledgment is received.

12. The baseband circuitry of claim 11, wherein the processor is configured to transmit the control data using the radio resources on the second antenna beam at a predefined time after repeating transmitting the instruction or after receiving the acknowledgement.

13. The baseband circuitry of claim 12, wherein the processor is configured to start a beam switching timer after the instruction is transmitted using the radio resources on the first antenna beam or after receiving the acknowledgment, and to start transmitting the control data using the radio resources on the second antenna beam after the timer expires.

14. The baseband circuitry of claim 13, wherein the beam switching timer is re-started after repeating transmitting the instruction.

15. The baseband circuitry of claim 11, wherein the processor is configured to transmit using the radio resources on the first antenna beam and to use the radio resources on the second antenna beam after reception of the acknowledgement.

16. The baseband circuitry of claim 11, wherein the processor is configured to con-figure the radio resources on the first antenna beam as default control signaling resource.

17. The baseband circuitry of claim 11, wherein the instruction is transmitted on a Physical Downlink Control CHannel, PDCCH.

18. The baseband circuitry of claim 11, wherein the instruction is part of a Media Access Control-Control Element, MAC-CE, and comprises information on a Transmission Configuration Indication, TCI.

19. The baseband circuitry of claim 18, wherein the instruction indicates a TCI state of a Control Resource Set, CORESET.

20. Method for user equipment, which is configured to communicate in a mobile communication system, the method comprising
receiving, using radio resources on a first antenna beam, an instruction to receive control data on radio resources on a second antenna beam;
acknowledging reception of the instruction; and
monitoring the radio resources on the first antenna beam for a repetition of the instruction after receiving the instruction.

21. Method for a base station, which is configured to communicate in a mobile communication system, the method comprising
transmitting, using radio resources on a first antenna beam, an instruction to receive control data using radio resources on a second antenna beam to user equipment;
monitoring the radio resources on the first antenna beam for receiving an acknowledgment on a reception of the instruction by the user equipment;
repeating transmitting the instruction using the radio resources on the first antenna beam in case the acknowledgement is not received; and
transmitting control data using the radio resources on the second antenna beam after the acknowledgment is received.

22. A machine readable medium including code, when executed, to cause a machine to perform a method for user equipment, which is configured to communicate in a mobile communication system, the method comprising
receiving, using radio resources on a first antenna beam, an instruction to receive control data on radio resources on a second antenna beam;
acknowledging reception of the instruction; and
monitoring the radio resources on the first antenna beam for a repetition of the instruction after receiving the instruction.

23. A machine readable medium including code, when executed, to cause a machine to perform a method for a base station, which is configured to communicate in a mobile communication system, the method comprising
transmitting, using radio resources on a first antenna beam, an instruction to receive control data using radio resources on a second antenna beam to user equipment;
monitoring the radio resources on the first antenna beam for receiving an acknowledgment on a reception of the instruction by the user equipment;
repeating transmitting the instruction using the radio resources on the first anten-na beam in case the acknowledgement is not received; and
transmitting control data using the radio resources on the second antenna beam after the acknowledgment is received.

* * * * *